(12) United States Patent
Watts et al.

(10) Patent No.: US 9,574,883 B2
(45) Date of Patent: Feb. 21, 2017

(54) ASSOCIATING SEMANTIC LOCATION DATA WITH AUTOMATED ENVIRONMENT MAPPING

(71) Applicant: X Development LLC, Mountain View, CA (US)

(72) Inventors: Kevin William Watts, Palo Alto, CA (US); Julian Mac Neille Mason, Redwood City, CA (US); Peter Elving Anderson-Sprecher, Los Altos Hills, CA (US)

(73) Assignee: X Development LLC, Mountain View, CA (US)

( * ) Notice: Subject to any disclaimer, the term of this patent is extended or adjusted under 35 U.S.C. 154(b) by 126 days.

(21) Appl. No.: 14/667,655

(22) Filed: Mar. 24, 2015

(65) Prior Publication Data

US 2016/0282126 A1 Sep. 29, 2016

(51) Int. Cl.
*G06K 9/62* (2006.01)
*G06T 3/00* (2006.01)
(Continued)

(52) U.S. Cl.
CPC ......... *G01C 21/206* (2013.01); *G06K 9/00664* (2013.01); *G06Q 10/08* (2013.01);
(Continued)

(58) Field of Classification Search
CPC .......................................... G01C 11/06–11/28
See application file for complete search history.

(56) References Cited

U.S. PATENT DOCUMENTS 5,363,305 A    11/1994 Cox et al.
5,920,261 A *   7/1999 Hughes ................. G01S 13/878
                                                    340/3.51
(Continued)

FOREIGN PATENT DOCUMENTS

EP      1541295 A1    6/2005
WO   2004/059900 A2   7/2004

OTHER PUBLICATIONS

A. Bouguerra et al., "An Autonomous Robotic System for Load Transportation", Sep. 22, 2009, 2009 IEEE Conference on Emerging Technologies and Factory Automation, pp. 1-4.
D. W. Eggert et al, "Estimating 3-D Rigid Body Transformations: A Comparison of Four Major Algorithms", Mar. 1, 1997, Machine Vision and Applications (1997), vol. 9, Issue 5-6, pp. 272-290.
J. Ho et al, "A New Affine Registration Algorithm for Matching 2D Point Sets", Feb. 21, 2007, 2007 IEEE Workshop on Applications of Computer Vision.
(Continued)

*Primary Examiner* — Brian P Werner
(74) *Attorney, Agent, or Firm* — McDonnell Boehnen Hulbert & Berghoff LLP

(57) ABSTRACT

Systems and methods are provided for generating maps with semantic labels. A computing device can determine a first map that includes features located at first positions and semantic labels located at semantic positions, and determine a second map that includes at least some of the features located at second positions. The computing device can identify a first region with fixed features located at first positions and corresponding equivalent second positions. The computing device can identify a second region with moved features located at first positions and corresponding non-equivalent second positions. The computing device can determine one or more transformations between first positions and second positions. The computing device can assign the semantic labels to the second map at second semantic positions, where the second semantic positions are the same in the first region, and where the second semantic positions in the second region are based on the transformation(s).

21 Claims, 16 Drawing Sheets

(51) Int. Cl.
    *G01C 21/20*     (2006.01)
    *G06K 9/00*     (2006.01)
    *H04W 4/04*     (2009.01)
    *G06Q 10/08*     (2012.01)
    *G05B 19/418*     (2006.01)
    *G05D 1/02*     (2006.01)

(52) U.S. Cl.
    CPC ....... *H04W 4/043* (2013.01); *G05B 19/41895* (2013.01); *G05B 2219/31007* (2013.01); *G05D 1/0274* (2013.01)

(56) References Cited

U.S. PATENT DOCUMENTS

| | | |
|---|---|---|
| 7,069,124 B1 | 6/2006 | Whittaker et al. |
| 7,162,338 B2 | 1/2007 | Goncalves et al. |
| 7,912,633 B1 | 3/2011 | Dietsch et al. |
| 2010/0085358 A1* | 4/2010 | Wegbreit ................ G06T 19/20 345/420 |
| 2012/0182392 A1 | 7/2012 | Kearns et al. |
| 2014/0207286 A1 | 7/2014 | Wang et al. |

OTHER PUBLICATIONS

S. Riisgaard et al., "SLAM for Dummies a Tutorial Approach to Simultaneous Localization and Mapping", May 1, 2004, 2004 Final Project for Cognitive Robotics, Massachusetts Institute of Technology, available via the Internet at ocw.mit.edu/courses/aeronautics-and-astronautics/16-412j-cognitive-robotics-spring-2005/projects/1aslam_blas_repo.pdf (last visited Mar. 24, 2015).

Wikimedia Foundation, "Simultaneous Localization and Mapping", Feb. 1, 2015, available via the Internet at en.wikipedia.org/w/index.php?title=Simultaneous_localization_and_mapping&oldid=645114504 (last visited Mar. 24, 2015).

Search Report and Written Opinion for PCT/US2016/018540 dated May 3, 2016.

Rogers et al., "SLAM with Expectation Maximization for Moveable Object Tracking", Intelligent Robots and Systems (IROS), 2010 IEEE/RSJ International Conference on IEEE, Piscataway, NJ, USA, Oct. 18, 2010, p. 2077-2082.

Wang et al., "Simultaneous Localization, Mapping and Moving Object Tracking", The International Journal of Robotics Research, vol. 26, No. 9, Sep. 1, 2007, p. 889-916.

* cited by examiner

For Fixed Regions of the Second Map:
  Copy First Semantic Labels to Same Positions in Second Map
For Moved Regions of the Second Map:
  Apply Regional Estimate to First Semantic Label Position to Get Second Semantic Label Position. Place Semantic Label in Second Map at Second Semantic Label Position.

ASSOCIATING SEMANTIC LOCATION DATA WITH AUTOMATED ENVIRONMENT MAPPING

BACKGROUND

Unless otherwise indicated herein, the materials described in this section are not prior art to the claims in this application and are not admitted to be prior art by inclusion in this section.

A robot can automatically map a space, such as the interior of part or all of a building and/or its surrounding outdoor regions, to help estimate the robot's position within the space. In some embodiments, a mapping algorithm, such as the SLAM (Simultaneous Localization and Mapping) algorithm, can be used by the robot to compute a metric map of the space. The metric map can indicate positions of objects in the space and, in some cases, can look like a floor plan. Once generated, the metric map can be used by the robot for navigation within the mapped space.

One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

In one aspect, a method is provided. A computing device determines a first map of an environment. The first map includes a plurality of features located at a corresponding plurality of first positions and a plurality of semantic labels located at a corresponding plurality of semantic positions. The computing device determines a second map of an environment, where the second map includes at least some of the plurality of features located at a corresponding plurality of second positions. The computing device identifies a first region of the environment that includes a plurality of fixed features, where a fixed feature in the plurality of fixed features is located at a corresponding first position of the plurality of first positions and is located at a corresponding second position of the plurality of second locations. The corresponding first position of the fixed feature is equivalent to the corresponding second position of the fixed feature. The computing device identifies a second region of the environment. The second region includes a plurality of moved features, where a moved feature in the plurality of moved features is located at a corresponding first position of the plurality of first positions and a different corresponding second position of the plurality of second positions. The corresponding first position of the moved feature is not equivalent to the different corresponding second position of the moved feature. The computing device determines one or more transformations between first positions and second positions of the plurality of moved features in the second region. The computing device assigns the plurality of semantic labels to the second map at a second plurality of semantic positions. The semantic positions in the second plurality of semantic positions for semantic labels in the first region are the same as the corresponding semantic positions in the first plurality of semantic positions. The semantic positions in the second plurality of semantic positions for semantic labels in the second region are based on the one or more transformations. The computing device generates an output based on the second map.

In another aspect, a computing device is provided. The computing device has one or more processors and data storage. The data storage includes at least computer-executable instructions stored thereon that, when executed by the one or more processors, cause the computing device to perform functions including: determining a first map of an environment, where the first map includes a plurality of features located at a corresponding plurality of first positions and a plurality of semantic labels located at a corresponding plurality of semantic positions; determining a second map of the environment, where the second map includes at least some of the plurality of features located at a corresponding plurality of second positions; identifying a first region of the environment including a plurality of fixed features, where a fixed feature in the plurality of fixed features is located at a corresponding first position of the plurality of first positions and located at a corresponding second position of the plurality of second locations, and where the corresponding first position of the fixed feature is equivalent to the corresponding second position of the fixed feature; identifying a second region of the environment including a plurality of moved features, where a moved feature in the plurality of moved features is located at a corresponding first position of the plurality of first positions and a different corresponding second position of the plurality of second positions, and where the corresponding first position of the moved feature is not equivalent to the different corresponding second position of the moved feature; determining one or more transformations between first positions and second positions of the plurality of moved features in the second region; assigning the plurality of semantic labels to the second map at a second plurality of semantic positions, where semantic positions in the second plurality of semantic positions for semantic labels in the first region are the same as the corresponding semantic positions in the first plurality of semantic positions, and where semantic positions in the second plurality of semantic positions for semantic labels in the second region are based on the one or more transformations; and generating an output based on the second map.

In another aspect, a non-transitory computer readable medium is provided. The non-transitory computer readable medium has stored thereon instructions, that when executed by one or more processors of a computing device, cause the computing device to perform functions. The functions include: determining a first map of an environment, where the first map includes a plurality of features located at a corresponding plurality of first positions and a plurality of semantic labels located at a corresponding plurality of semantic positions; determining a second map of the environment, where the second map includes at least some of the plurality of features located at a corresponding plurality of second positions; identifying a first region of the environment including a plurality of fixed features, where a fixed feature in the plurality of fixed features is located at a corresponding first position of the plurality of first positions and located at a corresponding second position of the plurality of second locations, and where the corresponding first position of the fixed feature is equivalent to the corresponding second position of the fixed feature; identifying a second region of the environment including a plurality of moved features, where a moved feature in the plurality of moved features is located at a corresponding first position of the plurality of first positions and a different corresponding second position of the plurality of second positions, and where the corresponding first position of the moved feature is not equivalent to the different corresponding second position of the moved feature; determining one or more transformations between first positions and second positions of the plurality of moved features in the second region; assigning the plurality of semantic labels to the second map at a second plurality of semantic positions, where semantic positions in the second plurality of semantic positions for semantic labels in the first region are the same as the corresponding semantic positions in the first plurality of semantic positions, and where semantic positions in the second plurality of semantic positions for semantic labels in the second region are based on the one or more transformations; and generating an output based on the second map.

In another aspect, an apparatus is provided. The apparatus includes: determining a first map of an environment, where the first map includes a plurality of features located at a corresponding plurality of first positions and a plurality of semantic labels located at a corresponding plurality of semantic positions; determining a second map of the environment, where the second map includes at least some of the plurality of features located at a corresponding plurality of second positions; identifying a first region of the environment including a plurality of fixed features, where a fixed feature in the plurality of fixed features is located at a corresponding first position of the plurality of first positions and located at a corresponding second position of the plurality of second locations, and where the corresponding first position of the fixed feature is equivalent to the corresponding second position of the fixed feature; identifying a second region of the environment including a plurality of moved features, where a moved feature in the plurality of moved features is located at a corresponding first position of the plurality of first positions and a different corresponding second position of the plurality of second positions, and where the corresponding first position of the moved feature is not equivalent to the different corresponding second position of the moved feature; determining one or more transformations between first positions and second positions of the plurality of moved features in the second region; assigning the plurality of semantic labels to the second map at a second plurality of semantic positions, where semantic positions in the second plurality of semantic positions for semantic labels in the first region are the same as the corresponding semantic positions in the first plurality of semantic positions, and where semantic positions in the second plurality of semantic positions for semantic labels in the second region are based on the one or more transformations; and generating an output based on the second map.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Overview

Figure 1:
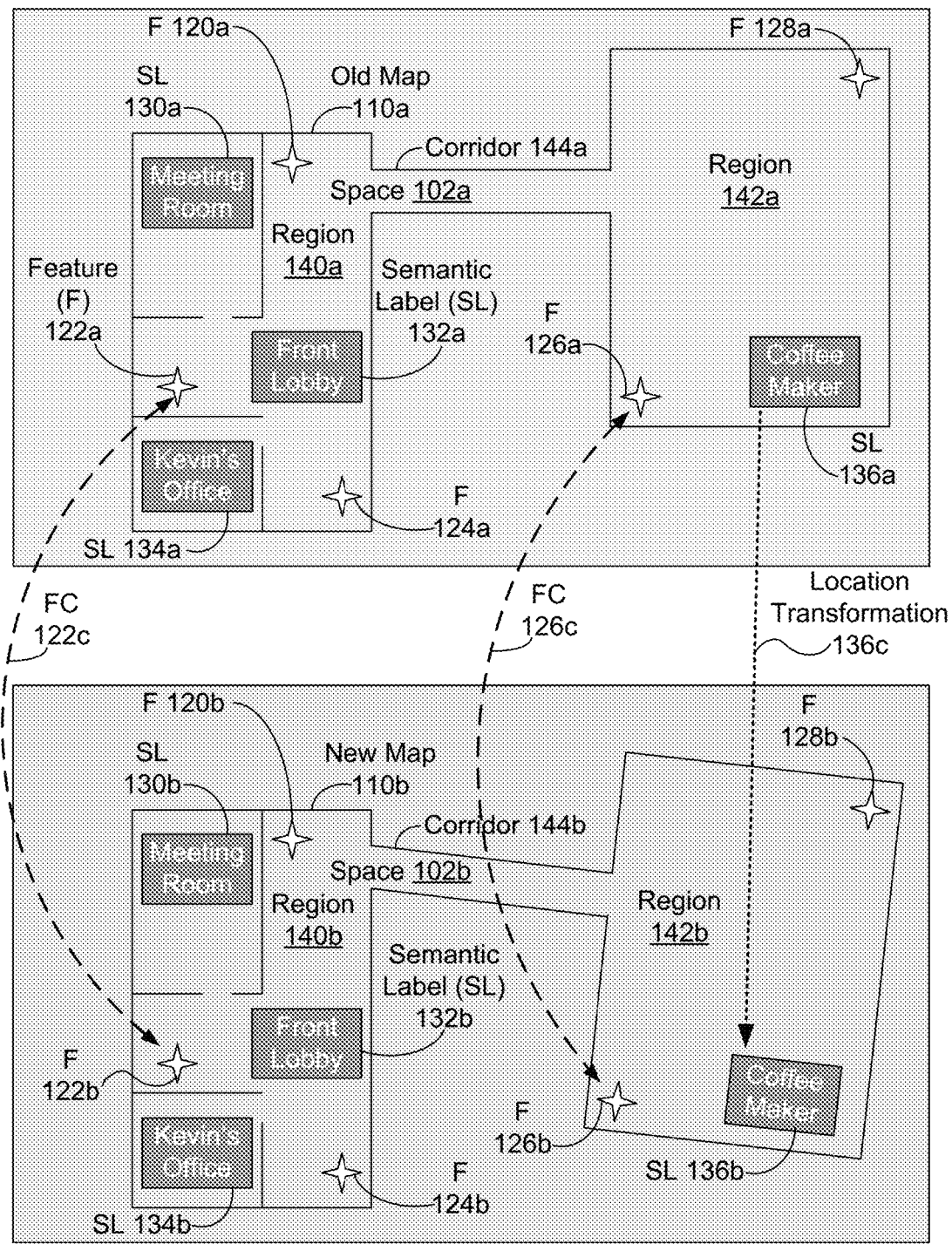
FIG. 1 shows a remapping scenario, in accordance with an example embodiment.

In some scenarios, a robot can operate in a space where parts of the space change and other parts of the space can stay the same. For example, at a robotically-operated warehouse space, a truck can arrive at and be aligned with a loading dock of the warehouse and can open its rear door for unloading, effectively adding a room (the interior of the truck) to the loading dock of the warehouse. Later, the truck can leave and be replaced at the loading dock with a different truck, effectively changing the room added to the loading dock of the warehouse. Other changes can be made to the warehouse, such as adding or closing loading docks, changing the use of interior spaces, and adding, removing, or changing racks and/or walls within the warehouse. Inside the warehouse, various (large) objects, such as pallets, racks, and equipment, can move which also changes the space of the warehouse. In other cases, a robot can be used to map an outdoor or mixed indoor/outdoor environment, such as a parking lot surrounding the aforementioned warehouse or a campus environment having buildings with surrounding grounds. Many other examples are possible as well.

A space S is an indoor and/or outdoor region of an environment; e.g., one or more portions of one or more buildings, a city block, a park, etc. The space S can include "features", or objects that can be unambiguously identified, such as doors, walls, corners, pieces of equipment, etc. In some examples, features can be installed specifically for robot navigation, like barcodes. A "map" of a space S can be a picture, chart, diagram, and/or other information that depicts and describes the space S, including some or all of the features in space S. In some embodiments, the map can be in a computer/robot-readable format. The map can include "semantic labels" or annotations providing information of features, other objects, and/or other locations in the space S, where each semantic label can be located at a corresponding "semantic location" within the map of the space S.

The semantic labels can provide information related to the map. The information related to the map can include, but is not limited to:

- information about objects and areas within a map; e.g., "Copy Machine", "External Network Access Point", "Conference Room 123B", "CEO's Office", "Exit 95 to I-80", "Conf. Room #4—Reserved Until 6 PM", "What is the chance of a chair or other object blocking way here?"
- information about occupants and/or visitors of the map; e.g., "Aisle 432 last visited by Robot #123 at 12:34:56 07 Aug. 2015", "George Washington slept here", "Room 123—Occupied by A. Smith"
- traffic rules related to the map; e.g., "Right Turn OK from this Lane", "One Way Starts Here", "Outbound Traffic Only Between 8 AM and 12 AM", "bottleneck during busy hour"
- environmental features related to the map; e.g., "Scenic Outlook", "−30 dBm Signal for SSID Warehouse473 Here", "Temperature Range in 2014: −16 to 91 deg F."
- information about the map itself; e.g., "Region last mapped on 1 Apr. 2015", "This area corresponds to region G-6 in LargeMap".

During map generation, coordinates of the features and perhaps additional objects/labels of the map can be measured. Features locations, semantic locations, and other locations in the map can be specified in terms of map coordinates; e.g., two-dimensional or three-dimensional coordinates. Other examples of spaces, maps, features, semantic labels, and semantic locations are possible as well.

The robot can remap the space periodically and/or after detecting changes in part or all of the space. After remapping, the robot or another computing device can compare features that are present in both an old (originally mapped) metric map and in a new (remapped) metric map to calculate relative poses (position and orientation) of the features. Coordinates for map features can be determined, either as part of the mapping process, from an external source such as Global Positioning System (GPS) satellites, and/or otherwise determined. Then, using the relative poses, a correspondence between locations using old map coordinates and new map coordinates can be determined. Additionally, by using coordinates of multiple (nearby) features, false positives or false correspondences between the old and new maps can be eliminated. Based on the correspondences, one or more transformations associating old map coordinates and new map coordinates can be determined, where each transformation associates coordinates of features within a local neighborhood (region) of the space. In some cases, different locations can have different transformations between old map coordinates and new map coordinates.

Semantic labels can be automatically remapped using the above-mentioned transformations between old and new map coordinates. For example, the semantic labels and semantic locations can initially be determined for the old map and in terms of corresponding old map coordinates. The transformation(s) between old and new map coordinates can be applied to the semantic locations to determined new (transformed) semantic locations in terms of new map coordinates. The semantic labels can then be added to the new map at the new semantic locations. Automatic remapping of semantic labels can decrease time and effort required to update new maps in comparison to manual placement/copying of semantic labels from an old map to a new map. Also, automatic remapping can be more accurate than manual placement of semantic labels onto a new map—labels are less likely to get lost, altered, mixed up, etc. when automatic, rather than manual, remapping is used.

Systems and Techniques for Associating Semantic Location Data after Remapping

FIG. 1 shows remapping scenario 100, in accordance with an example embodiment. Remapping scenario can be carried out by a computing device, such as computing device 900 discussed below at least in the context of FIG. 9A, perhaps configured as a mobile robotic device. In an upper portion of FIG. 1, an example old map 110a of space 102a is shown that includes regions 140a and 142a connected by corridor 144a. Map 110a can be generated by the computing device moving throughout space 102a, obtaining sensor data for space 102a using sensors of the computing device, and utilizing a mapping algorithm, such as but not limited to the SLAM algorithm, to generate map 110a of space 102a.

Region 140a includes three features: feature 120a at upper center of region 140a, feature 122a at center left, and feature 124a at lower right. Region 140a also includes three semantic labels (SLs): semantic label 130a at upper left of region 140a for a "Meeting Room", semantic label 132a at center right for a "Front Lobby", and semantic label 134a at lower left for "Kevin's Office". Region 142a includes feature 126a at lower left of region 142a, feature 128a at upper right, and semantic label 136a indicating a position of a "Coffee Maker".

Later in the scenario, space 102a is changed to become space 102b, which is depicted in the lower portion of FIG. 1. In particular, space 102b shows that regions 140a and 140b are virtually identical, while region 142a has been rotated in a clockwise direction to become region 142b, and that corridor 144a has been adjusted to become corridor 144b, which connects regions 140b and 142b.

After space 102b is formed, the space is remapped to create new map 110b that includes regions 140b and 142b connected by corridor 144b. Space 102b can be remapped to generate map 110b by the computing device moving throughout space 102b, obtaining sensor data for space 102b using sensors of the computing device, and utilizing a mapping algorithm, such as but not limited to the SLAM algorithm, to generate map 110b of space 102b.

Like region 140a, region 140b includes three features: feature 120b at upper center of region 140b, feature 122b at center left, and feature 124b at lower right. As with region 140a, region 140b includes three semantic labels: semantic label 130b at upper left of region 140b for the "Meeting Room", semantic label 132b at center right for the "Front Lobby", and semantic label 134b at lower left for "Kevin's Office". As with region 142a, region 142b includes feature 126b at lower left of region 142b, feature 128b at upper right, and semantic label 136b indicating the position of the "Coffee Maker". Each feature and semantic label can be associated with a location that can be represented (or specified) in terms of coordinates, such as map coordinates, coordinates of the space, and/or other data representing a location of a feature or semantic label.

The computing device can generate correspondences between locations in old map 110a and 110b. For example, the computing device can generate feature correspondence (FC) 122c to relate a location of feature 122a in old map 110a with a location of a corresponding feature, feature 122b, in new map 110b. A similar feature correspondence 126c is shown for feature 126a in old map 110a and corresponding feature 126b in new map 110b.

The computing device can use correspondences to develop transformations, or functions that represent the movement of features. For example, the computing device can compare feature correspondences 122c and 126c to indicate that at least one region of regions 140b and 142b in new map 110b have moved during remapping relative to regions 140a and 142a of old map 110a. Examining feature correspondence 122c, a correspondence between locations of features 120a and 120b, and a correspondence between locations of features 124a and 124b can indicate that region 140a did not change position when being remapped as region 140b, and so suggest that region 140b did not change position since region 140a was mapped in old map 110a. As such, the computing device can assume that semantic labels within region 140a did not change during remapping as region 140b. Then, the computing device can remap the semantic labels within region 140a to region 140b by utilizing the semantic locations of respective semantic labels 130a, 132a, and 134a in old map 110a as semantic locations of respective semantic labels 130b, 132b, and 134b in new map 110b. That is, for regions that do not change between an old map and a new map, the computing device can remap semantic labels from the old map to the new map by copying semantic labels from the old map and placing those semantic labels in the same semantic locations within the new map.

Additionally, examining feature correspondence 126c and a correspondence between locations of features 128a and 128b can indicate to the computing device that region 142b of new map 110b has been rotated since region 142a was mapped in old map 110a.

The computing device can determine transformation(s), such as one or more affine transformations, rigid body transformations, and/or other transformations, to model various movements of features and/or semantic locations; in this example, a rotation transformation of a semantic location for semantic label 136a in old map 110a can be used as location transformation 136c to determine a semantic location for semantic label 136b in new map 110b. Then, the computing device can use location transformation 136c to determine the semantic location for semantic label 134b, rather than using manual repositioning of semantic label 136b into new map 102b.

Once the computing device has placed all of the structures and semantic labels into new map 110b, scenario 100 can end. In some embodiments, the computing device can output and/or store new map 110b (and/or old map 110a); e.g., display map 110b, print map 110b, transmit map 110b. In other embodiments, the computing device can provide map 110b for use by one or more computing devices/robotic devices; e.g., to enable the computing device(s)/robotic device(s) to navigate the environment mapped by new map 110b; to assist the computing device(s)/robotic device(s) to locate, obtain, map, manipulate, and/or otherwise interact with features, objects, and locations within the environment mapped by new map 110b. In particular embodiments, the computing device can be a computing device of the one or more computing devices/robotic devices.

Figure 2:
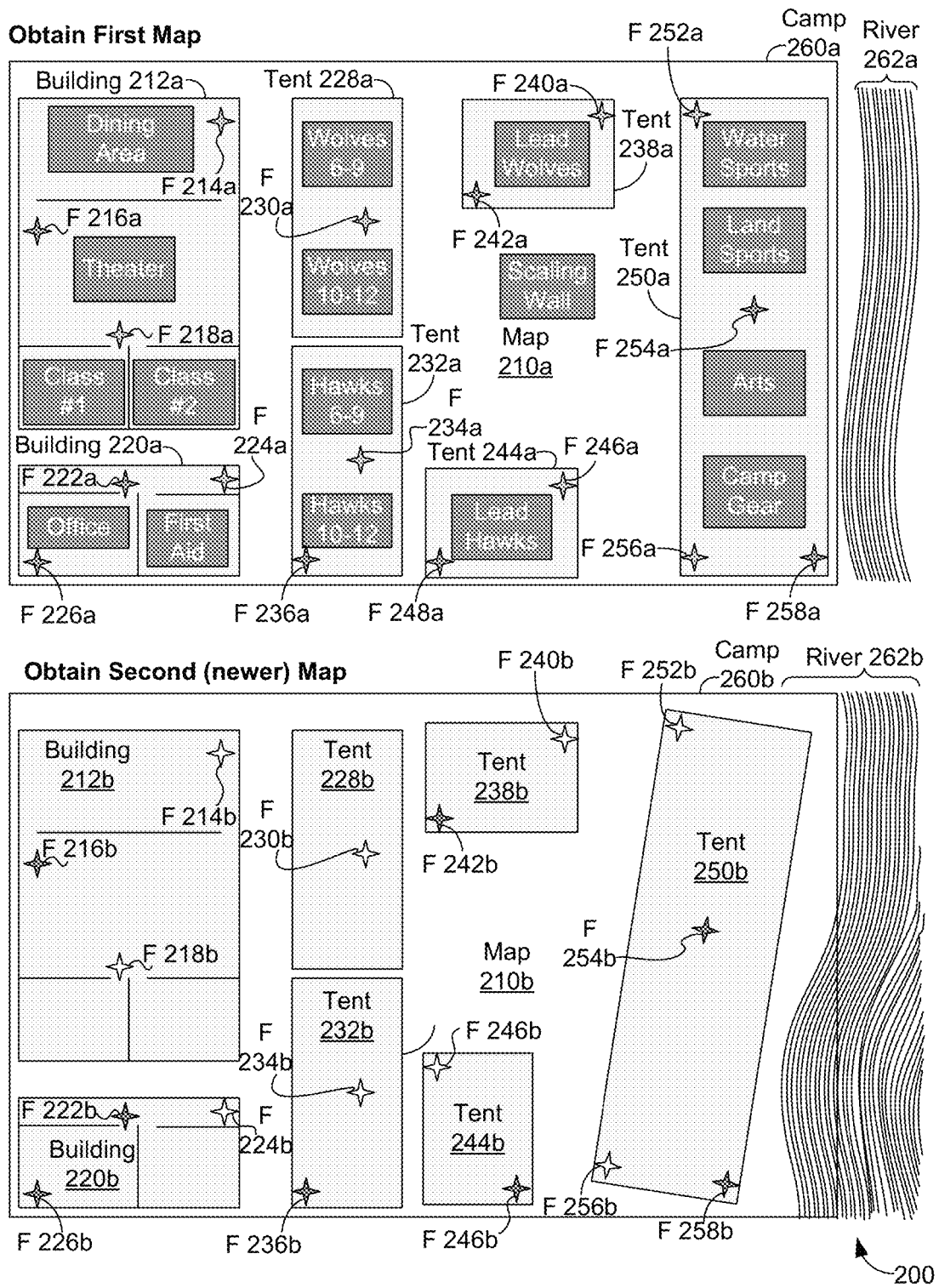
FIG. 2 shows two maps of another remapping scenario, in accordance with an example embodiment.

FIG. 2 shows two maps for remapping scenario 200, in accordance with an example embodiment. In scenario 200, indoor and outdoor regions of a camp are mapped twice—a first, and earlier, map is generated and later, a second map is generated. The camp is bordered by a river that partially overflows between the time the first map is generated and the second map is generated. The overflowing river causes some of the tents in the camp to be moved. The first map is annotated with semantic labels, and initially, the second map is not annotated with semantic labels. Scenario 200 illustrates a process for mapping semantic labels from the first map with to the second map—this process can be carried out by a computing device, such as computing device 900 discussed below at least in the context of FIG. 9A, perhaps configured as a mobile robotic device.

An upper portion of FIG. 2 shows a copy of map 210a that can be obtained by the computing device, where map 210a maps the camp at a first time. In some embodiments, the computing device can generate part or all of map 210a; e.g., using a SLAM algorithm or other mapping algorithm. In some scenarios, map 210a can be generated at least in part based on sensor data obtained from one or more sensors of the computing device.

Map 210a maps camp 260a bordered by river 262a. Camp 260a includes buildings 212a and 220a, tents 228a, 232a, 238a, 244a, and 250a. Building 212a, at upper left of map 210a, includes features 214a, 216a, and 218a and is annotated with four semantic labels for a "Dining Area" location, a "Theater" location, a "Class #1" location, and a "Class #2" location. Building 220a, at lower left of map 210a, includes features 222a, 224a, and 226a, and is annotated with two semantic labels for an "Office" location and a "First Aid" location. FIG. 2 shows tent 228a to the right of building 212a, with tent 228a including feature 230a and semantic labels for a "Wolves 6-9" location and a "Wolves 10-12" location. Tent 232a is shown in FIG. 2 as just below tent 228a and to the right of buildings 212a and 220a, with tent 232a including features 234a and 236a and semantic labels for a "Hawks 6-9" location and a "Hawks 10-12" location.

Tent 242a is shown in FIG. 2 as right of tent 228a and including features 240a and 242a and a semantic label for a "Lead Wolves" location. Just below tent 242a, map 210a has a semantic label for a "Scaling Wall" location. Tent 244a is shown below the "Scaling Wall" location and to the right of tent 232a, with tent 244a having features 246a and 248a and a semantic label for a "Lead Hawks" location. FIG. 2 shows tent 250a to the right of tents 238a and 244a, and to the left of river 262a, with tent 250a including features 252a, 254a, 256a, and 258a, and having semantic labels for a "Water Sports" location, a "Land Sports" location, an "Arts" location, and a "Camp Gear" location.

A lower portion of FIG. 2 shows a copy of map 210b that can be obtained by the computing device, where map 210b maps the camp at a second time after the first time. In some embodiments, the computing device can generate part or all of map 210b; e.g., using a SLAM algorithm or other mapping algorithm. In some scenarios, map 210b can be generated at least in part based on sensor data obtained from one or more sensors of the computing device.

In scenario 200, between the first time when map 210a is generated and the second time when map 210b is generated, the river bordering the camps moves from positions represented by river 262a to positions represented by river 262b. In particular, by the second time, river 262b has overflowed onto a portion of the camp, as indicated at lower-right of map 210b. In scenario 200, three tents are moved due to the river overflow. These tents are moved from respective positions indicated for tents 238a, 244a, and 250a in map 210a to respective positions for tents 238b, 244b, and 250b in map 210b. In particular, tent 238a is moved to the left and slightly upward to reach to a position of tent 238b, tent 244a is rotated approximately 90 degrees in a counter-clockwise direction to reach a position of tent 244b, and tent 250a is moved slightly to the right and rotated approximately 10 degrees in a counter-clockwise direction to reach a position of tent 250b.

Map 210b maps camp 260b bordered by river 262b, with camp 260b and river 262b corresponding to camp 260a and river 262a, respectively, of map 210a. Camp 260b includes buildings 212b and 220b, tents 228b, 232b, 238b, 244b, and 250b, corresponding to buildings 212a and 220a and tents 228a, 232a, 238a, 244a, and 250a of map 210a.

Building 212b, at upper left of map 210b, includes respective features 214b, 216b, and 218b that correspond to respective features 214a, 216a, and 218b of map 210a. Building 220b, at lower left of map 210b, includes respective features 222b, 224b, and 226b that correspond to respective features 222a, 224a, and 226a of map 210a. FIG. 2 shows tent 228b to the right of building 212b, with tent 228b including feature 230b corresponding to feature 230a of map 210a. Tent 232b is shown in FIG. 2 as just below tent 228b and to the right of buildings 212b and 220b, with tent 232b including respective features 234b and 236b that correspond to respective features 234a and 236a of map 210a. Tent 242b is shown in FIG. 2 as right of tent 228b and including features 240b and 242b that correspond to respective features 240a and 242a of map 210a. Tent 244b is shown below tent 238b and to the right of tent 232b; with tent 244b having respective features 246b and 248b that correspond with features 246a and 248a of map 210a. FIG. 2 shows tent 250b to the right of tents 238b and 244b, and to the left of river 260b, with tent 250b including respective features 252b, 254b, 256b, and 258b that correspond to respective features 252a, 254a, 256a, and 258a of map 210a.

Figure 3:
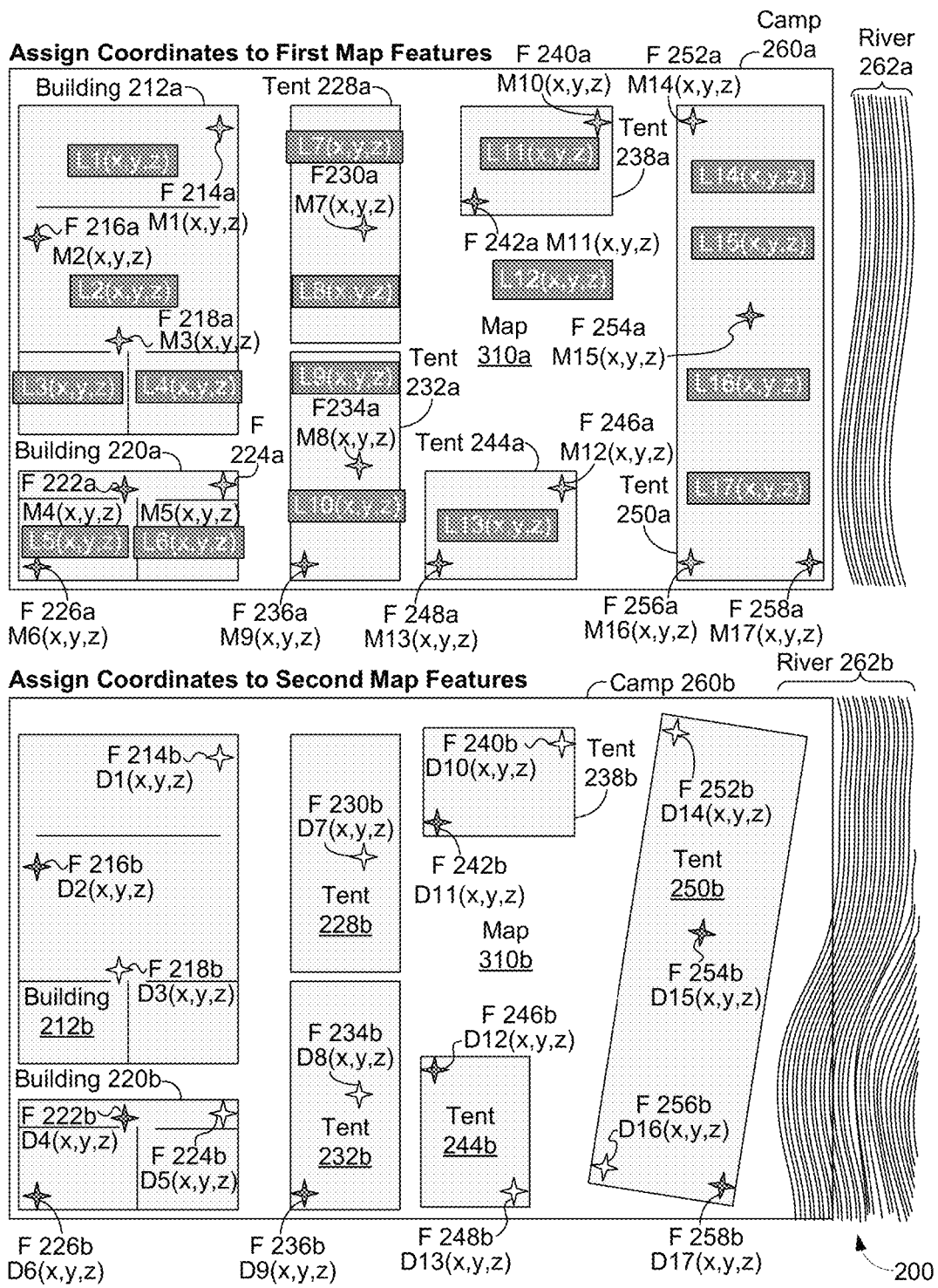
FIG. 3 indicates assignment of coordinates for the two maps of the scenario of FIG. 2, in accordance with an example embodiment.

FIG. 3 indicates assignment of coordinates for the maps of scenario 200 using maps 310a and 310b, in accordance with an example embodiment. Map 310a, shown in an upper portion of FIG. 3, corresponds to map 210a (generated at the first time) with three-dimensional (3D) coordinates being assigned to each feature and semantic label originally in map 210a. Map 310b, shown in a lower portion of FIG. 3, corresponds to map 210b (generated at the second time) with 3D coordinates being assigned to each feature originally in map 210b. Map coordinates can be determined as part of a mapping algorithm, can be obtained from an external source (e.g., latitude, longitude and/or elevation values obtained from a location sensor), in accord with an external map, such as being assigned coordinates used by an atlas or other collection of maps, relative to one or more landmarks such as building 212a/212b and/or building 220a/220b, or by other approaches for assigning coordinates. In scenario 200, the same approach is used to assign 3D coordinates to features and semantic labels map 210a as so obtain map 310a as is used to assign 3D coordinates to features in map 210b and so obtain map 310b. In other scenarios, 2D coordinates can be assigned to maps rather than 3D coordinates.

Table 1 below shows coordinates assigned to features in maps 310a and 310b.

TABLE 1

| | Map 310a Features/Coordinates | | | Map 310b Features/Coordinates | |
|---|---|---|---|---|---|
| Feature in Map 310a | Related Map 310b Structure | Coordinates in Map 310a | Feature in Map 310b | Related Map 310b Structure | Coordinates in Map 310b |
| Feature 214a | Building 212a | M1(x, y, z) | Feature 214b | Building 212b | D1(x, y, z) |
| Feature 216a | Building 212a | M2(x, y, z) | Feature 216b | Building 212b | D2(x, y, z) |
| Feature 218a | Building 212a | M3(x, y, z) | Feature 218b | Building 212b | D3(x, y, z) |
| Feature 222a | Building 220a | M4(x, y, z) | Feature 222b | Building 220b | D4(x, y, z) |
| Feature 224a | Building 220a | M5(x, y, z) | Feature 224b | Building 220b | D5(x, y, z) |
| Feature 226a | Building 220a | M6(x, y, z) | Feature 226b | Building 220b | D6(x, y, z) |
| Feature 230a | Tent 228a | M7(x, y, z) | Feature 230b | Tent 228b | D7(x, y, z) |
| Feature 234a | Tent 232a | M8(x, y, z) | Feature 234b | Tent 232b | D8(x, y, z) |
| Feature 236a | Tent 232a | M9(x, y, z) | Feature 236b | Tent 232b | D9(x, y, z) |
| Feature 240a | Tent 238a | M10(x, y, z) | Feature 240b | Tent 238b | D10(x, y, z) |
| Feature 242a | Tent 238a | M11(x, y, z) | Feature 242b | Tent 238b | D11(x, y, z) |
| Feature 246a | Tent 244a | M12(x, y, z) | Feature 246b | Tent 244b | D12(x, y, z) |
| Feature 248a | Tent 244a | M13(x, y, z) | Feature 248b | Tent 244b | D13(x, y, z) |
| Feature 252a | Tent 250a | M14(x, y, z) | Feature 252b | Tent 250b | D14(x, y, z) |
| Feature 254a | Tent 250a | M15(x, y, z) | Feature 254b | Tent 250b | D15(x, y, z) |
| Feature 256a | Tent 250a | M16(x, y, z) | Feature 256b | Tent 250b | D16(x, y, z) |
| Feature 258a | Tent 250a | M17(x, y, z) | Feature 258b | Tent 250b | D17(x, y, z) |

Table 2 below shows coordinates assigned to semantic labels in map 310a—note that no semantic labels are assigned in map 310b.

TABLE 2

| Semantic Label (SL) in Map 310a | Associated Structure (if any) in Map 310a | Semantic Label Coordinates in Map 310a |
|---|---|---|
| Dining Area SL | Building 212a | L1(x, y, z) |
| Theater SL | Building 212a | L2(x, y, z) |
| Class #1 SL | Building 212a | L3(x, y, z) |
| Class #2 SL | Building 212a | L4(x, y, z) |
| Office SL | Building 220a | L5(x, y, z) |
| First Aid SL | Building 220a | L6(x, y, z) |
| Wolves 6-9 SL | Tent 228a | L7(x, y, z) |
| Wolves 10-12 SL | Tent 228a | L8(x, y, z) |
| Hawks 6-9 SL | Tent 232a | L9(x, y, z) |
| Hawks 10-12 SL | Tent 232a | L10(x, y, z) |
| Lead Wolves SL | Tent 238a | L11(x, y, z) |
| Scaling Wall SL | N/A | L12(x, y, z) |
| Lead Hawks SL | Tent 244a | L13(x, y, z) |
| Water Sports SL | Tent 250a | L14(x, y, z) |
| Land Sports SL | Tent 250a | L15(x, y, z) |
| Arts SL | Tent 250a | L16(x, y, z) |
| Camp Gear SL | Tent 250a | L17(x, y, z) |

Figure 4:
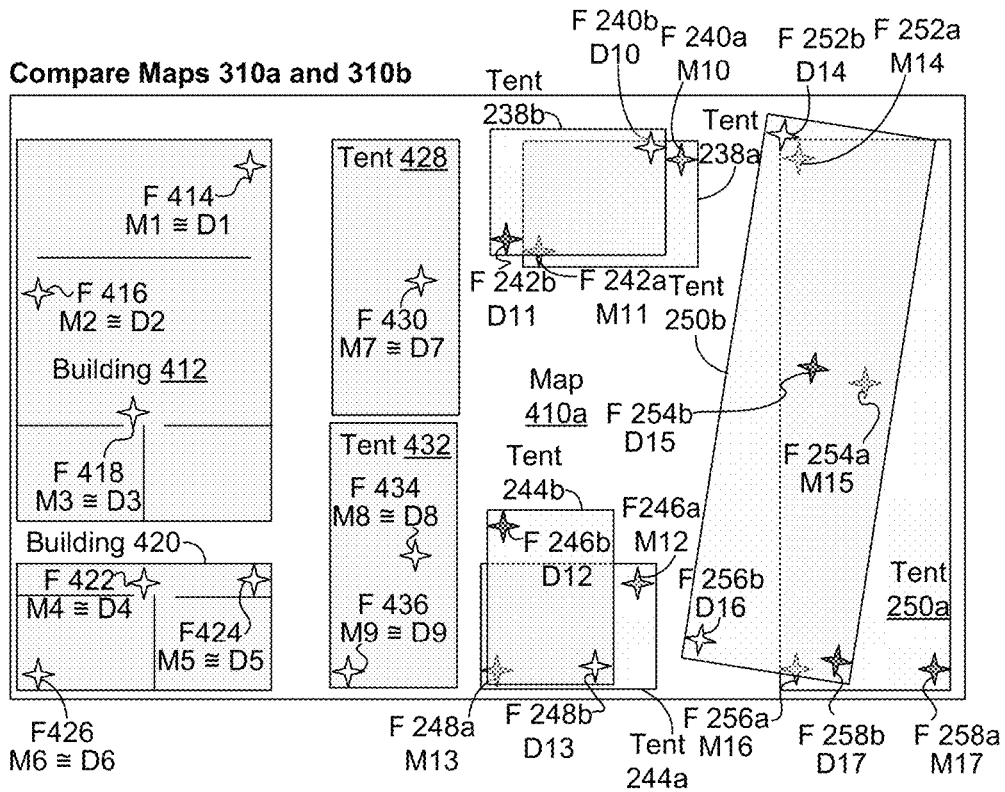
FIG. 4 depicts determination of moved regions of the two maps of the scenario of FIG. 2, in accordance with an example embodiment.
Figure 4:
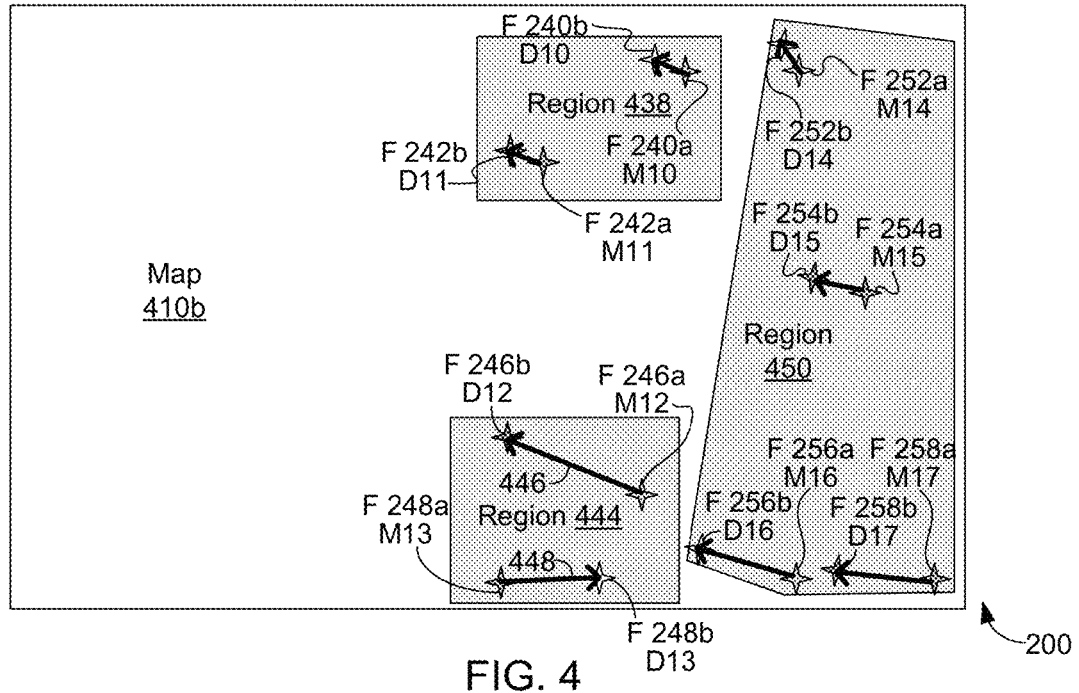

FIG. 4 depicts determination of moved regions between map 310a and map 310b of scenario 200, in accordance with an example embodiment. Map 410a is shown in an upper portion of FIG. 4. Map 410a indicates a comparison between features of map 310a and features of map 310b, showing buildings 412 and 420 with no changes between maps 310a and 310b.

The computing device can determine whether a region R that has been mapped by two maps A and B has moved between map A and map B by determining whether coordinates of features F1, F2, ... Fn within region R are "equivalent" between maps A and B; that is, the coordinates of the features between maps A and B are equal or nearly equal within one or more threshold coordinate values. For example, let coordinates in map A of features F1, F2, ... Fn in region R be A1, A2, ... An and let coordinates in map B of features F1, F2, ... Fn in region R be B1, B2, ... Bn. Then region R has not moved between map A and map B, if A1 is equivalent to B1, and A2 is equivalent to B2, ... and An is equivalent to Bn. The notation A1≅B1 is used herein to indicate A1 that is equivalent to B1 and the notation A1 ≆ B1 is used herein to indicate A1 that is not equivalent to B1. Using that notation, the computing device can determine that region R did not change between map A and map B if A1≅B1 and A2≅B2 ... and An≅Bn. Additionally, can determine that region R did change between map A and map B if A1 ≆ B1 or A2 ≆ B2 ... or An ≆ Bn. Other techniques can be used to determine whether (or not) a region has moved between maps based on coordinates of features within the region of the two maps.

In scenario 200, the computing device can determine that no changes are made in a particular region mapped by both maps 310a and 310b by determining that all coordinates of features in the particular region of map 310a are equivalent to corresponding coordinates of features in the particular region of map 310b. In scenario 200, particular regions can be designated by structures—buildings and tents—in the camp being mapped by maps 310a and 310b. That is, each structure can be considered to be a region for comparison purposes. In other scenarios, one or more other entities than structures, such as a whole map, a portion of a map, a portion of a structure, or some other division of a map, can be used to delineate a region for comparison purposes.

Map 310a includes a map of building 212a and map 310b includes a map of corresponding building 212b. In map 310a, building 212a includes feature 214a at coordinates M1(x, y, z) or "M1" for short, feature 216a at coordinates M2, and feature 218a at coordinates M3; while building 212b of map 310b includes feature 214b at coordinates D1(x, y, z) or "D1" for short, feature 216b at coordinates D2, and feature 218b at coordinates D3.

Then, the computing device can compare coordinates of features of building 212a to coordinates of corresponding features of building 212b; that is, coordinates M1 of feature 214a can be compared to coordinates D1 of feature 214b, coordinates M2 of feature 216a can be compared to coordinates D2 of feature 216b, and coordinates M3 of feature 218a can be compared to coordinates D3 of feature 218b. The computing device can compare coordinates M1 to coordinates D1 by determining that coordinates M1 are equivalent to coordinates D1 by determining that coordinates M1 are within one or more thresholds of coordinates D1 or perhaps by some other comparison technique.

For an example of using threshold values to determine coordinates are equivalent, and thus that corresponding locations are equivalent, let $M1=(X_{M1}, Y_{M1}, Z_{M1})$ and $D1=(X_{D1}, Y_{D1}, Z_{D1})$. Then if $|X_{M1}-X_{D1}|<X_T$, then the x values of M1 and D1 can be considered to be equivalent, where $X_T$ is a threshold value with $X_T>0$. Similarly, if $|Y_{M1}-Y_{D1}|<Y_T$, then the y values of M1 and D1 can be considered to be equivalent, where $Y_T$ is a threshold value with $Y_T>0$ and if $|Z_{M1}-Z_{D1}|<Z_T$, then the z values of M1 and D1 can be considered to be equivalent. If x, y, and z values of M1 and D1 are considered to be equivalent, then coordinates M1 can be considered to be equivalent to coordinates D1. Further, if M1 is equivalent to D1, M2 is equivalent to D2, and M3 is equivalent to D3, then building 212b can be considered to not have moved during remapping to generate map 310b compared to building 212a mapped as part of map 310a.

In scenario 200, M1 is equivalent to D1 as indicated in FIG. 4 by the notation "M1≅D1". FIG. 4 also shows that in scenario 200, M2≅D2 and M3≅D3, and the computing device can determine that building 212b of map 310b did not change during remapping in comparison to originally mapped building 212a of map 310a. Further, in scenario 200, M4≅D4, M5≅D5, and M6≅D6, and so building 220b of map 310b can be considered to have not moved during remapping from originally mapped building 220a of map 310a. Map 410a of FIG. 4 shows building 412 to represent both buildings 212a and 212b, as buildings 212a, 212b did not change during remapping of the camp by map 310b in comparison to map 310a, and shows building 420 to represent both buildings 220a and 220b, as buildings 220a, 220b did not change during remapping.

Additionally, in scenario 200, tent 228a of map 310a includes feature 230a with coordinates M7, with M7≅D7, where D7 are the coordinates of feature 230b of tent 228b of map 310b. Further, in scenario 200, tent 232a of map 310a includes respective features 234a, 236a having respective coordinates M8, M9, with M8≅D8 and M9≅D9, where D8 and D9 are respective coordinates of features 234b, 236b of tent 228b of map 310b, and so tents 232a, 232b did not change during remapping. Therefore, map 410a of FIG. 4 includes respective tents 428 and 432 to reflect that respective pairs of tents 228a, 228b and of tents 232a, 232b did not change during remapping.

Map 410a also shows that tent 238a differs from tent 238b, tent 244a differs from 244b, and tent 250a differs from 250b. The computing device can determine that coordinates M10 of feature 240a of tent 238a differ from coordinates D10 of feature 240b of tent 238b and that coordinates M11 of feature 242a of tent 238a differ from coordinates D11 of feature 242b of tent 238b. Then, by determining that M10 ≆ D10 and that M11 ≆ D11, the computing device can determine tent 238a differs from tent 238b.

Also, the computing device can determine that coordinates M12 of feature 246a of tent 244a differ from coordinates D12 of feature 246b of tent 244b and that coordinates M13 of feature 248a of tent 244a differ from coordinates D13 of feature 248b of tent 244b. Then, by determining that M12 ≆ D12 and that M13 ≆ D13, the computing device can determine tent 244a differs from tent 244b.

Additionally, the computing device can determine that coordinates M14 of feature 252a of tent 250a differ from coordinates D14 of feature 252b of tent 250b, coordinates M15 of feature 254a of tent 250a differ from coordinates D15 of feature 254b of tent 250b, coordinates M16 of feature 256a of tent 250a differ from coordinates D16 of feature 256b of tent 250b, and coordinates M17 of feature 258a of tent 250a differ from coordinates D17 of feature 258b of tent 250b. Then, by determining that M14 ≆ D14, M15 ≆ D15, M16 ≆ D16, and M17 ≆ D17, the computing device can determine tent 250a differs from tent 250b.

A lower portion of FIG. 4 includes map 410b, which shows regions 438, 444, and 450 that moved between maps 310a and 310b. Map 410b also uses arrows to indicate changes between locations/coordinates of features within each region 438, 444, and 450. For example, region 444 includes has arrow 446 between feature 246a and 246b to indicate that feature 246a in map 310a moved to the left and upward when mapped as feature 246b in map 310b, and arrow 448 between feature 248a and 248b to indicate that feature 248a in map 310a moved to the right and slightly upward when mapped as feature 248b in map 310b.

After determining moved regions between two maps, the computing device can determine one or more transformations for one or more moved regions that can be used to transform coordinates for the one or more moved regions in a first map, such as map 310a, to coordinates of the one or more moved regions in a second map, such as map 310b. For examples of transformations, the computing device can determine affine and/or rigid body transformations for moved regions between maps.

In other scenarios than scenario 200, the mapping between old map coordinates and new map coordinates can be non-uniform. For example, mapping errors in an older map; e.g., map 210a or 310a, or a newer map; e.g., map 210b or 310b, can cause the older and newer maps to have different features, regions, semantic labels, etc. For example, if the SLAM algorithm is used to generate the older and/or newer maps, a loop closure error in SLAM optimization or other SLAM-related error can lead to the mapping error(s) in the older and/or newer maps. Additionally, changes in the environment can cause non-uniform mapping between old map coordinates and new map coordinates. For example, in a scenario related to scenario 200, river 260b floods the entire region where tent 250b is located and so tent 250b is taken down. Then, in comparing a new map taken of the flooded environment with older map 210a or 310a, coordinates related to tent 250a will be missing from the new map of the flooded environment. As another example, in a scenario related to scenario 100, a region of an older map corresponding to a truck at a warehouse can leave (or arrive) a loading bay before a newer map is generated, causing non-uniform coordinates due to the now missing (or now present) truck. Many other examples are possible as well.

In some embodiments, a global optimization algorithm can be utilized that makes a graph of the features, prunes false correspondences, and establish coordinate mappings between features in the old and new maps. Coordinate transforms for the semantic labels can then be determined as a function (e.g. weighted average) of the coordinate mappings for some or all of the related and/or nearby features. Determining which features are related and/or nearby features to a specific label can be determined algorithmically; e.g. select the nearest K features to the semantic label, for K>0, or explicitly added as part of labeling; e.g. associating a semantic label with one or more features, such as a semantic label for an "Office" that is associated with features representing corners, walls, and/or other features of the office. Associating features and semantic labels can improve reliability for certain applications. For example, a "Classroom 1" semantic label may be linked to the walls of the classroom. As another example, a semantic label of "External network access point" may be linked to map features, such as corners or other (visual) features of a device acting as the external network access point. Many other examples are possible as well.

Figure 5A:
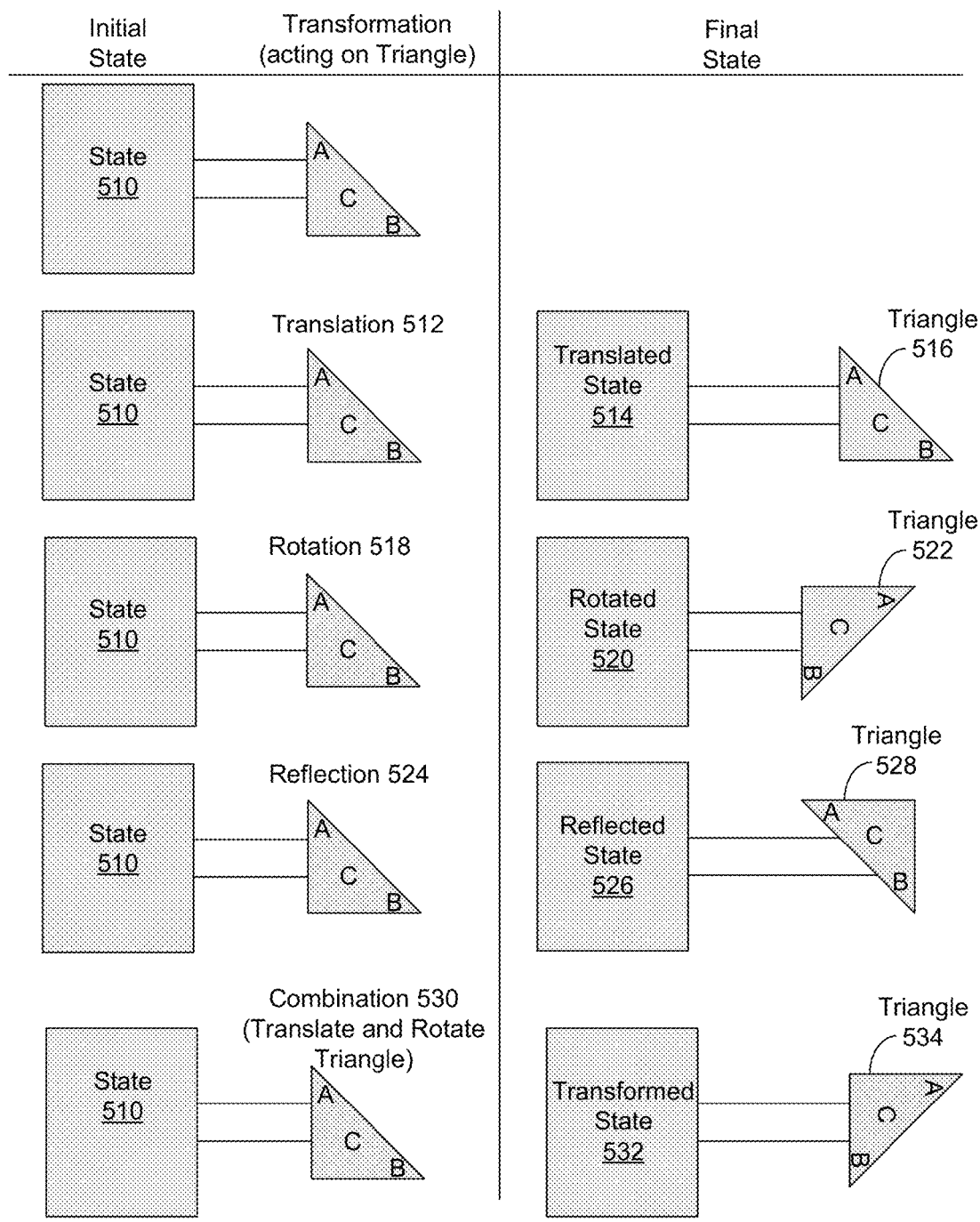
FIG. 5A shows example rigid body/affine transformations, in accordance with an example embodiment.

FIG. 5A shows example affine/rigid body transformations 500, in accordance with an example embodiment. An affine transformation is a function that preserves points, straight lines, planes, and ratios of distances between points lying on a straight line, but not necessarily preserving angles between lines or distances between points. A rigid body transformation is an affine transformation that does preserve distances between points. Example rigid body transformations include translations, rotations, and reflections, and example affine transformations include the rigid body transformations (that is, translations, rotations, and reflections), shearing transformations, scaling transformations, and combinations of affine transformations. Other transformations are possible as well.

Figure 5B:
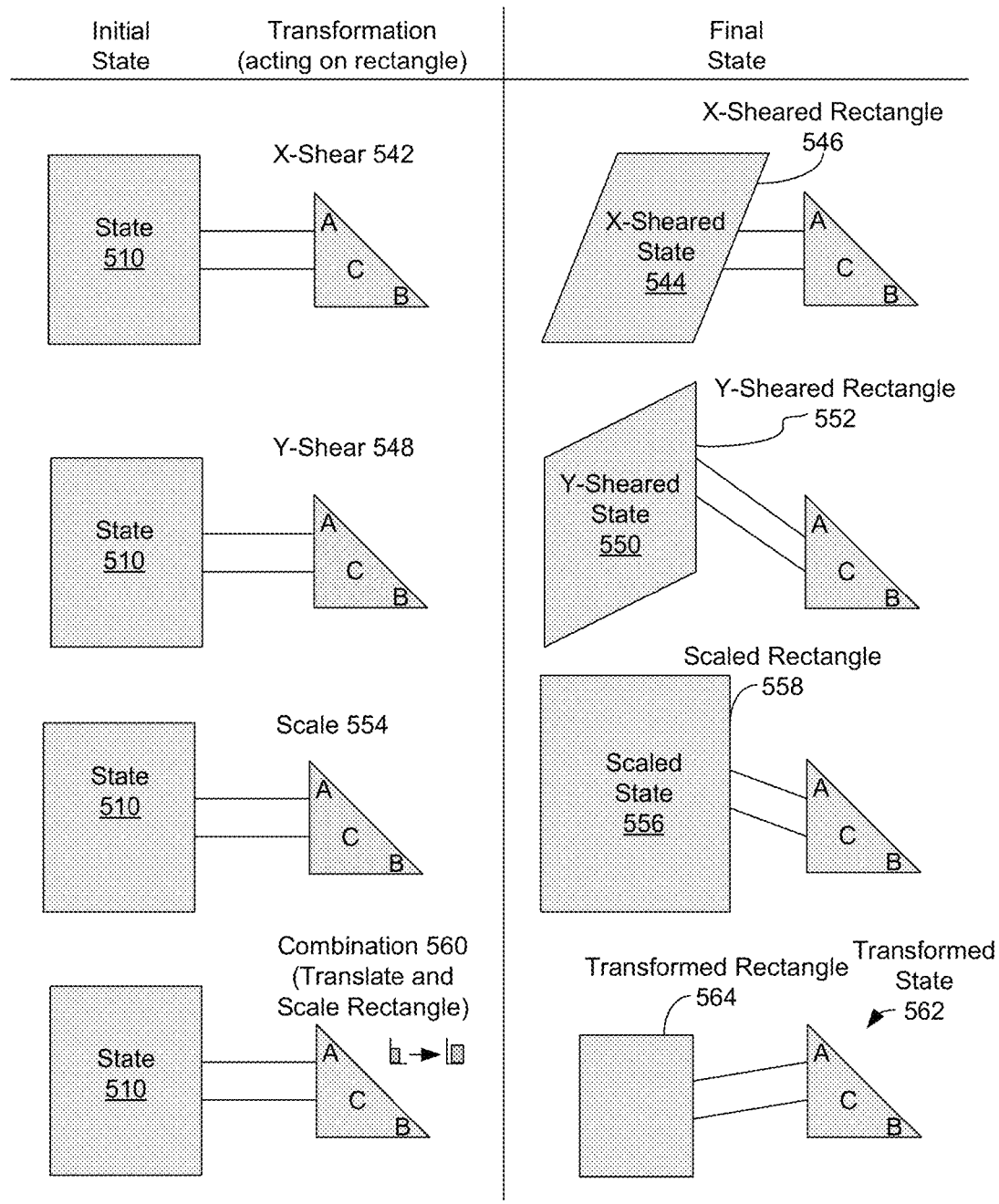
FIG. 5B shows example affine transformations, in accordance with an example embodiment.

Example rigid body (and therefore, affine) transformations 500 are shown in FIG. 5A. At the top of FIG. 5A, initial state 510 is shown with a rectangle to the left of a triangle connected by a corridor. In FIGS. 5A and 5B, the triangle is labeled with a letter "A" in an upper-left corner of the triangle, a letter "B" in a lower-right corner of the triangle, and a letter "C" in the center of the triangle. Each of the rigid body transformations shown in FIG. 5A operates on the triangle of initial state 510. Then, after the rigid body transformation is applied to the triangle, the corridor is reconnected between the rectangle and the transformed triangle to reach a final state after the transformation.

A translation transformation can be a transformation that moves each transformed, or translated, point a constant distance in a specified direction. Example translation transformation 512 moves the triangle to the right shown as triangle 516 of translated (final) state 514. Additionally, the corridor of translated state 514 is shown as being lengthened in comparison with the corridor of initial state 510.

A rotation transformation can be a transformation that moves each transformed, or rotated, point about a fixed point. Example rotation transformation 518 moves the triangle 90 degrees clockwise about the point labeled "C" of the triangle to reach a position shown as triangle 522 of rotated (final) state 520. The corridor of rotated state 520 is shown as the same in comparison with the corridor of initial state 510.

A reflection transformation can be a transformation that moves each transformed, or reflected, point of an initial object about a fixed line, or axis, so that an image of the translated object is a mirror image of the initial object. Example reflection transformation 524 moves the triangle about axis formed by a diagonal of the triangle between points A and B to reach a position shown as triangle 528 of reflected (final) state 526. The corridor of rotated state 526 is shown as being partially lengthened in comparison with the corridor of initial state 510.

A combination rigid-body transformation can include two or more of the previously mentioned rigid-body transformations; that is, a combination of translation(s), rotation(s), and/or reflection(s). Example combination transformation 530 includes translation transformation 512 and then rotation transformation 518 to move the triangle to the right and then rotate the triangle 90 degrees clockwise about point C to reach a position shown as triangle 534 of transformed (final) state 532. The corridor of transformed state 532 is shown as being lengthened in comparison with the corridor of initial state 510.

FIG. 5B shows example affine transformations 540, in accordance with an example embodiment. Example affine transformations 540 are shown in FIG. 5B based on initial state 510. Each of the example affine transformations shown in FIG. 5B operates on the rectangle of initial state 510. Then, after the affine transformation is applied to the rectangle, the corridor is reconnected in the direction between the midpoint in the vertical direction of the transformed rectangle and the midpoint of the triangle in the vertical direction to reach a final state after the transformation. Along with rigid body transformations, example affine transformations 540 include shear transformations, scaling transformations, and combinations of affine transformations. Other affine transformations are possible as well.

A shear transformation can be a transformation that moves each point in a fixed direction by an amount proportional to its signed distance from a line parallel to the fixed direction. An example shear transformation is shown as X-shear transformation 542 where the fixed line is a lower horizontal line (representing the X-axis) of the rectangle, and the signed distance is proportional to the y coordinate of points in the rectangle. As shown in FIG. 5B, example X-shear transformation 542 leads to X-sheared state 544 including X-sheared rectangle 546. X-shear transformation 542 preserves position of the lower horizontal line of X-sheared rectangle 546 from the rectangle of initial state 510, and moves an upper horizontal line of the rectangle of the initial state to the right, causing the vertical lines of the rectangle of the initial state to transform to diagonal lines moving up and the right and connecting the horizontal sides in X-sheared rectangle 546. Additionally, the corridor of X-sheared state 544 is shown as partially shortened in comparison with the corridor of initial state 510 to accommodate a right-side diagonal line of X-sheared rectangle 546.

Another example shear transformation is shown as Y-shear transformation 548 where the fixed line is a left side (representing the Y-axis) of the rectangle, and the signed distance is proportional to the x coordinate of points in the rectangle. As shown in FIG. 5B, example Y-shear transformation 548 leads to Y-sheared state 550 including Y-sheared rectangle 552. Y-shear transformation 548 preserves position of left vertical line of Y-sheared rectangle 552 from the rectangle of initial state 510, and moves a right vertical line of the rectangle of the initial state upward, causing the horizontal sides of the rectangle of the initial state to transform to diagonal lines moving up and the right and connecting the vertical lines of Y-sheared rectangle 552. Additionally, the corridor of Y-sheared state 550 is shown as moving downward and rightward to accommodate upward movement of the midpoint in the vertical direction of Y-sheared rectangle 552. Other shear transformations are possible as well.

A scale transformation is a transformation that enlarges or shrinks one or more objects in one or more directions by a pre-determined scale factor. A uniform scale transformation uses one scale factor for all directions, while a non-uniform scale transformation uses multiple scale factors for different directions. A scale transformation can then involve taking a coordinate for an object in a dimension (e.g., an x coordinate, y coordinate, z coordinate for the object) and multiplying the coordinate by the scale factor for the dimension. Then, a scale factor of 0 will reduce the object to a point, scale factors between 0 and 1 will shrink the object, a scale factor of 1 will preserve the object's size, and a scale factor greater than 1 will enlarge the object. In some cases, negative scale factors are not permitted, while in other cases, negative scale factors are permitted and lead to reflecting and enlarging the object (if the scale factor is less than −1; e.g., −2, −3 . . . ) or reflecting and shrinking the object (if the scale factor is between 0 and −1).

An example uniform scale transformation is shown as scale transformation 554 that uses a scale factor of approximately 1.25 and the lower-left corner of the rectangle of initial state 510 and of scaled rectangle 558 is assigned to the coordinates (0, 0), and so the lower-left corner of scaled rectangle 558 is unchanged by the scale transformation. As shown in FIG. 5B, scale transformation 556 enlarges scaled rectangle 558 by approximately 25% in both x and y dimensions in comparison with the rectangle of initial state 510. Additionally, the corridor of scaled state 550 is shown as moving downward and rightward to accommodate upward movement of the midpoint in the vertical direction of scaled rectangle 558. Other scale transformations are possible as well.

A combination affine transformation includes two or more of the previously mentioned affine transformations; that is, a combination of translation(s), rotation(s), reflection(s), shear transformation(s), and scale transformation(s). Example combination transformation 560 includes a uniform scale transformation of the initial state rectangle by a scale factor of approximately 0.75 and a translation transformation that moves the scaled rectangle by one unit rightward to reach a position shown as transformed rectangle 564 of transformed (final) state 562. The corridor of transformed state 562 is shown as moving upward and rightward to accommodate downward movement of the midpoint in the vertical direction of transformed rectangle 564.

Figure 5C:
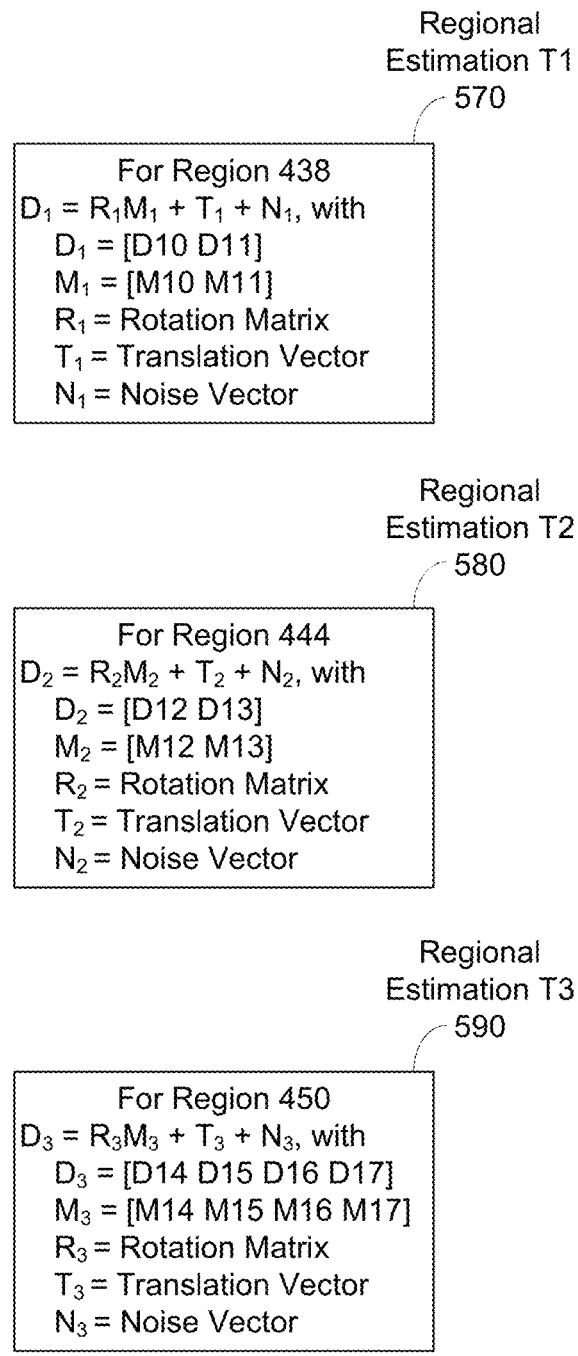
FIG. 5C depicts estimated rigid body transformations for the moved regions of the scenario of FIG. 2, in accordance with an example embodiment.

FIG. 5C depicts estimated rigid body transformations 570, 580, 590 for respective moved regions 438, 444, 450 in scenario 200, in accordance with an example embodiment. In scenario 200, the computing device determines respective rigid body transformations 570, 580, 590 for respective moved regions 438, 444, 450 based on coordinates of features in maps 310a and 310b. To determine transformations between coordinates of features in different maps, the computing device can utilize algorithms that determine singular value decompositions and/or eigensystem computations of matrices of coordinates, an iterative closest point (ICP) algorithm, a rigid body registration algorithm for registering 2D and/or 3D coordinates, an affine registration algorithm for registering 2D and/or 3D coordinates, a 2D or 3D rigid body estimation algorithm, a 2D or 3D affine estimation algorithm, and/or one or more other algorithms.

Many of these algorithms attempt to find one or more transformations between two sets of points. For example, one set of 3D points can be some or all of the coordinates M1, M2 . . . M17 of features from map 310a, and another set of 3D points can be some or all of the coordinates D1, D2 . . . D17 of features from map 310a. FIG. 5C shows examples of rigid body transformations between coordinates in moved regions 438, 444, and 450; e.g. as determined by a rigid body registration or 3-D rigid body estimation algorithm. The rigid body transformations shown in FIG. 5C are indicated as regional estimates: regional estimate T1 570 estimates transformations between points in region 438, where the points include coordinates M10 and M11 from map 310a and coordinates D10 and D11 from map 310b. For regional estimate T1 570, let $D_1=[D10\ D11]$ and $M_1=[M10\ M11]$. Then, $D_1$ can be estimated as $D_1=R_1\ M_1+T_1+N_1$, where $R_1$ is a rotation matrix representing a rotation transformation, $T_1$ is a translation vector representing a translation vector, and $N_1$ is a noise vector—if $N_1=0$, then regional estimate T1 570 can be termed a noiseless estimation.

Also, regional estimate T2 580 estimates transformations between points in region 444, where the points include coordinates M12 and M13 from map 310a and coordinates D12 and D13 from map 310b. For regional estimate T2 580, let $D_2=[D12\ D13]$ and $M_2=[M12\ M13]$. Then, $D_2$ can be estimated as $D_2=R_2\ M_2+T_2+N_2$, where $R_2$ is a rotation matrix, $T_2$ is a translation vector, and $N_2$ is a noise vector.

Further, regional estimate T3 590 estimates transformations between points in region 450, where the points include coordinates M14, M15, M16, and M17 from map 310a and coordinates D14, D15, D16, and D17 from map 310b. For regional estimate T3 590, let $D_3$=[D14 D15 D16 D17] and $M_3$=[M14 M15 M16 M17]. Then, $D_3$ can be estimated as $D_3 = R_3 M_3 + T_3 + N_3$, where $R_3$ is a rotation matrix, $T_3$ is a translation vector, and $N_3$ is a noise vector. In some scenarios, one estimation can be applied to multiple regions. In other scenarios, other estimates for transformations of points (or registrations of points) in moved regions can be used; e.g., estimates based on affine transformations, estimates based on other registration/point estimation techniques.

Figure 6:
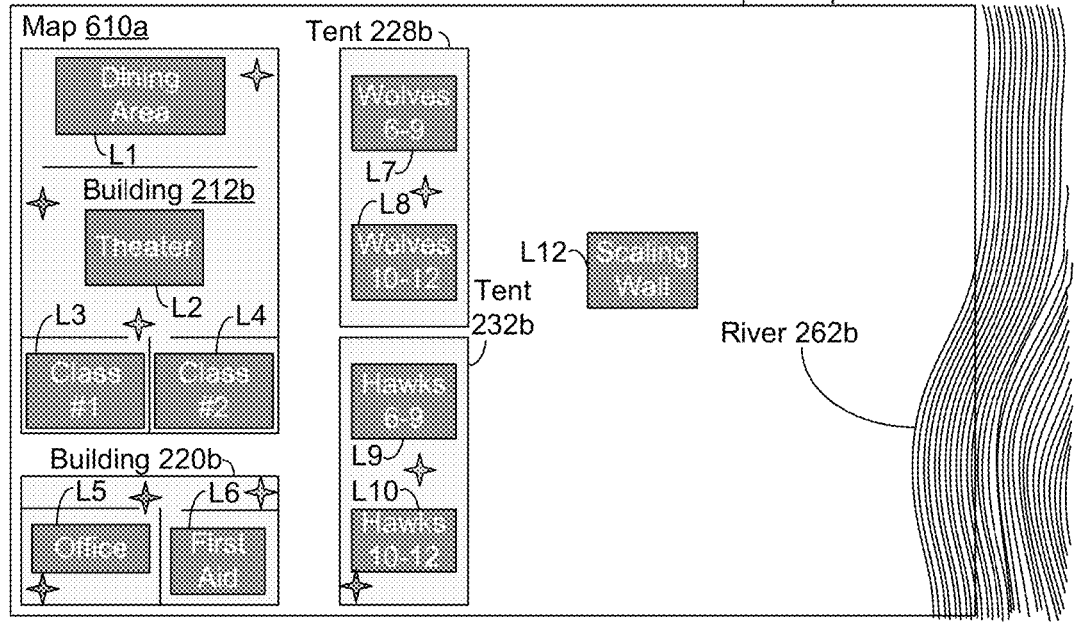
FIG. 6 depicts assignment of semantic labels to the second map of the scenario of FIG. 2, in accordance with an example embodiment.
Figure 6:
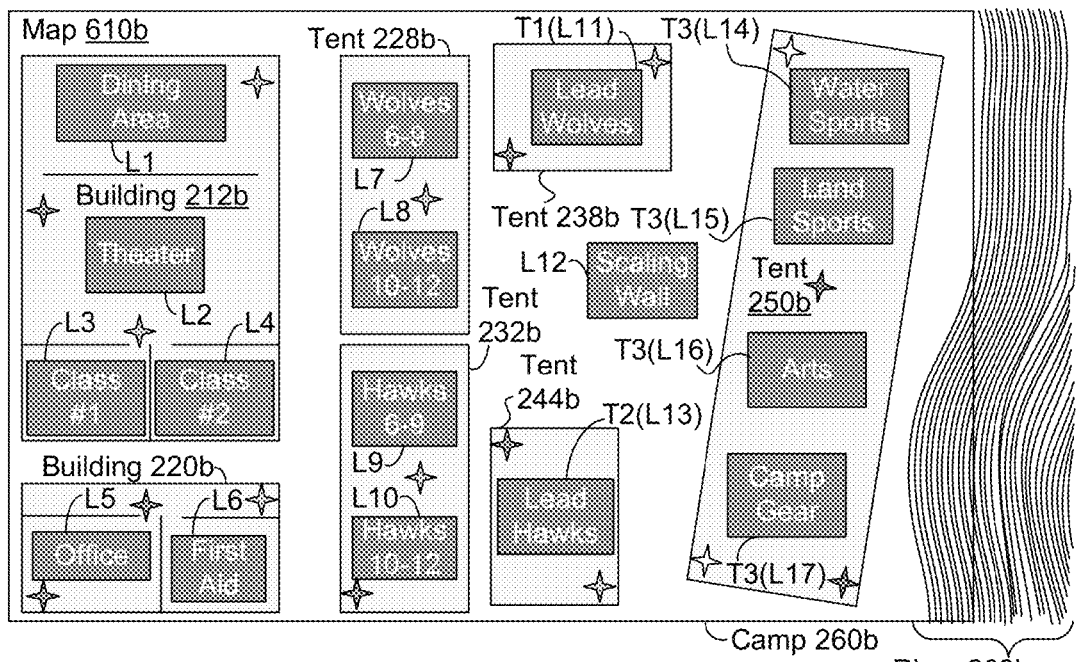

FIG. 6 depicts assignment of semantic labels to the second map of scenario 200, in accordance with an example embodiment. Scenario 200 continues with the computing device placing semantic labels on the second map; e.g., map 310b. For fixed (unchanged/unmoved) regions between the first map; e.g., map 310a, and the second map, the computing device can determine that semantic labels in the fixed regions between can be placed at the same coordinates in the second map as used for the semantic labels in the first map. An upper portion of FIG. 6 shows map 610a representing the second map with fixed regions and corresponding semantic labels in place, but with moved regions and corresponding semantic labels not yet in place. Map 610a also shows the second map having an outline rectangle representing camp 260b and a course of river 262b.

For an example of placing semantic labels in fixed regions, coordinates of features of tent 228a of the first map and tent 228b of the second map did not change—that is, the region represented by tent 228a (or 228b) is a fixed region. Then, the computing device can place the semantic label "Wolves 6-9" at coordinates L7 in tent 228b of map 610a, as the semantic label "Wolves 6-9" was placed at coordinates L7 in tent 228a of the first map. Similarly, the computing device can place the semantic label "Wolves 10-12" at coordinates L8 in tent 228b of map 610a, as the semantic label "Wolves 10-12" was placed at coordinates L8 of tent 228a.

Additionally, semantic labels that are unassociated with a region, such as the semantic label "Scaling Wall", can be placed at the same coordinates in the second map as were used in the first map. In scenario 200, the semantic label "Scaling Wall" is placed at coordinates L12 in the second map, as shown in map 610a. In other scenarios, one or more unassociated semantic labels can be omitted from the second map or placed manually on the second map if placing the one or more unassociated semantic labels at the same coordinates is unworkable for the second map in these other scenarios.

For moved regions between the first and second maps, the computing device can apply a regional estimation to coordinates of a semantic label in the first map to determine corresponding coordinates for the semantic label in the second map. For example, semantic label "Lead Wolves" is at coordinates L11 of tent 238a of the first map. Tent 238a is part of region 438, which has corresponding regional estimation T1 of $D_1 = R_1 * M_1 + T_1 + N_1$, with $D_1$ representing one or more points in the second map, $M_1$ representing one or more points in the first map, and $R_1$, $T_1$, and $N_1$ as discussed above in the context of FIG. 5C. Let T1(L11) be the regional estimation of coordinates L11 in the second map; that is $T1(L11) = R_1 * L11 + T_1 + N_1$. Then, the computing device can put the semantic label "Lead Wolves" at coordinates T1(L11) in tent 238b.

Map 610b at a lower portion of FIG. 6 shows the second map with both moved and fixed regions, and corresponding semantic labels, in place. Map 610b shows that the computing device placed the semantic label "Lead Wolves" at coordinates T1(L11) within tent 238b of the second map. To place the "Lead Hawks" semantic label, the computing device can determine that the "Lead Hawks" semantic label is within tent 244a of moved region 444, and so can determine that region 444 has corresponding regional estimation T2 580, so that coordinates L13 of the "Lead Hawks" semantic label in tent 238a correspond to T2(L13)= $R_2 * L13 + T_2 + N_2$, where T2(L13) represents the coordinates of L13 as transformed by regional estimation T2 580, and where $R_2$, $T_2$, and $N_2$ are as discussed above in the context of FIG. 5C.

In scenario 200, tent 244a was rotated approximately 90 degrees in a counter-clockwise direction to reach the position of tent 244b. Map 610b does not show the semantic label for "Lead Hawks" as being rotated; as the semantic label is only associated with one point or set of coordinates L13. In other scenarios, semantic labels can be associated with multiple points/sets of coordinates; e.g., for rectangular shaped semantic labels, two points can be utilized, such a first point/set of coordinates for an upper-left-hand corner of the semantic label and a second point/set of coordinates for a lower-right-hand corner of the semantic label. Then, if a moved region was rotated, a corresponding transformation applicable to the moved region should also rotate the points/sets of coordinates of the semantic label in the moved region, and so lead to rotation of the semantic label in accord with the rotation of the moved region.

To place the semantic labels within tent 250b, the computing device can determine that tent 250b is within moved region 450, and that region 450 has corresponding regional estimation T3 590, so that coordinates L14, L15, L16, and L17 of the semantic regions of tent 250a will correspond to transformations by regional estimation T3 590 of the associated coordinates for tent 250b. For the "Water Sports" semantic label having coordinates L14 in tent 250a, the corresponding coordinates for the "Water Sports" semantic label in tent 250b are T3(L14), with $T3(L14) = R_3 * L14 + T_3 + N_3$, where T3(L14) represents the coordinates of L14 as transformed by regional estimation R3 590, and where $R_3$, $T_3$, and $N_3$ are as discussed above in the context of FIG. 5C. Additionally, for the respective "Land Sports", "Arts", and "Camp Gear" semantic labels having respective coordinates L15, L16, and L17 in tent 250a, the corresponding coordinates for the respective "Land Sports", "Arts", and "Camp Gear" semantic labels in tent 250b are T3(L15), T3(L16), and T3(L17), respectively, with $T3(L15) = R_3 * L15 + T_3 + N_3$, $T3(L16) = R_3 * L16 + T_3 + N_3$, and $T3(L17) = R_3 * L17 + T_3 + N_3$, where T3(L15), T3(L16), and T3(L17) respectively represent the coordinates of L15, L16, and L17 as respectively transformed by regional estimation R3 590, and where $R_3$, $T_3$, and $N_3$ are as discussed above in the context of FIG. 5C.

Once the computing device has placed all of the structures and semantic labels into map 610b, scenario 200 can end. In some embodiments, the computing device can output and/or store map 610b (or other map(s) of scenario 200); e.g., display map 610b, print map 610b, transmit map 610b. In other embodiments, the computing device can provide map 610b for use by one or more computing devices/robotic devices; e.g., to enable the computing device(s)/robotic device(s) to navigate the environment mapped by map 610b; to assist the computing device(s)/robotic device(s) to locate, obtain, map, manipulate, and/or otherwise interact with features, objects, and locations within the environment mapped by map 610b. In particular embodiments, the computing device can be a robot of the one or more computing devices/robotic devices.

Example Robotic Devices

Example embodiments, including embodiments related to scenarios 100 and/or 200 discussed above, may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Figure 7A:
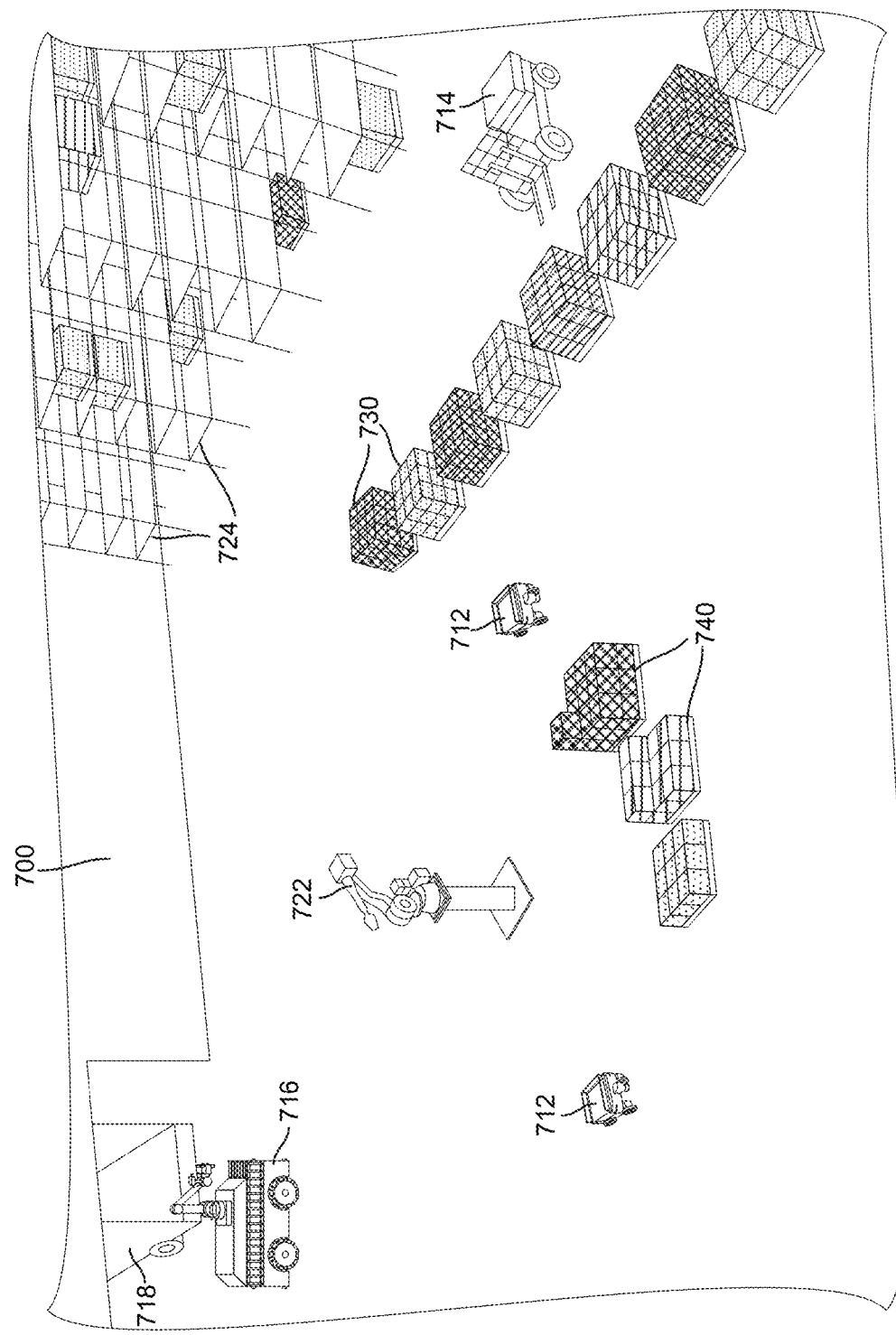
FIG. 7A shows a robotic fleet, according to an example embodiment.

FIG. 7A depicts a robotic fleet within a warehouse setting, according to an example embodiment. More specifically, different types of robotic devices may form a heterogeneous robotic fleet 700 that may be controlled to collaborate to perform tasks related to the processing of items, objects, or boxes within a warehouse environment. Certain example types and numbers of different robotic devices are shown here for illustration purposes, but robotic fleet 700 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 700 is an autonomous guided vehicle (AGV) 712, which may be a relatively small, mobile device with wheels that may function to transport individual packages, cases, or totes from one location to another within the warehouse. Another example type of robotic device is an autonomous fork truck 714, a mobile device with a forklift that may be used to transport pallets of boxes and/or to lift pallets of boxes (e.g., to place the pallets onto a rack for storage). An additional example type of robotic device is a robotic truck loader/unloader 716, a mobile device with a robotic manipulator as well as other components such as optical sensors to facilitate loading and/or unloading boxes onto and/or off of trucks or other vehicles. For instance, robotic truck unloader 716 may be used to load boxes onto delivery truck 718, which may be parked adjacent to the warehouse. In some examples, movements of delivery truck 718 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 700 may also include various fixed components that may be positioned within the warehouse. In some examples, one or more fixed robotic devices may be used to move or otherwise process boxes. For instance, a pedestal robot 722 may include a robotic arm elevated on a pedestal that is fixed to the ground floor within the warehouse. The pedestal robot 722 may be controlled to distribute boxes between other robots and/or to stack and unstack pallets of boxes. For example, the pedestal robot 722 may pick up and move boxes from nearby pallets 740 and distribute the boxes to individual AGV's 712 for transportation to other locations within the warehouse.

In additional examples, robotic fleet 700 may employ additional fixed components positioned within a warehouse space. For instance, high density storage racks 724 may be used to store pallets and/or objects within the warehouse. The storage racks 724 may be designed and positioned to facilitate interaction with one or more robotic devices within the fleet, such as autonomous fork truck 714. In further examples, certain ground space may be selected and used for storage of pallets or boxes as well or instead. For instance, pallets 730 may be positioned within the warehouse environment at chosen locations for certain periods of time to allow the pallets to be picked up, distributed, or otherwise processed by one or more of the robotic devices.

Figure 7B:
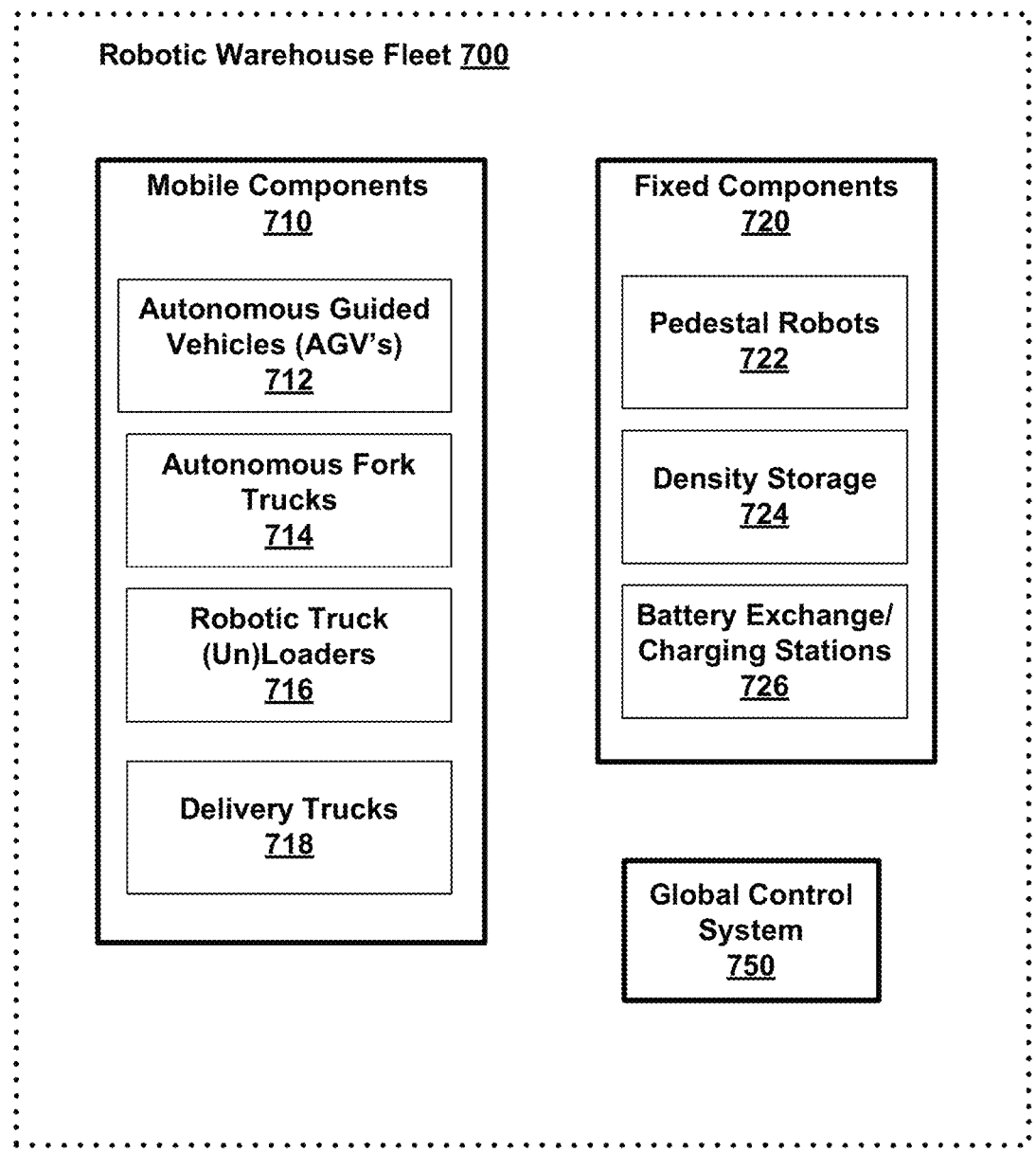
FIG. 7B is a functional block diagram illustrating components of a robotic fleet, according to an example embodiment.

FIG. 7B is a functional block diagram illustrating components of a robotic warehouse fleet 700, according to an example embodiment. The robotic fleet 700 could include one or more of various mobile components, such as AGV's 712, autonomous fork trucks 714, robotic truck loaders/unloaders 716, and delivery trucks 718. The robotic fleet 700 may additionally include one or more fixed components positioned within a warehouse or other environment, such as pedestal robots 722, density storage containers 724, and battery exchange/charging stations 726. In further examples, different numbers and types of the components illustrated within FIG. 7B may be included within a fleet, certain types may be omitted, and additional functional and/or physical components may be added to the examples illustrated by FIGS. 7A and 7B as well. To coordinate actions of separate components, a global control system 750, such as a remote, cloud-based server system, may communicate (e.g., through wireless communication) with some or all of the system components and/or with separate local control systems of individual components.

Within examples, certain of the fixed components 720 may be installed before deployment of the rest of the robotic fleet 700. In some examples, one or more mobile robots may be brought in to map a space before determining placement of certain fixed components 720, such as the pedestal robots 722 or battery exchange stations 726. Once map information is available, the system may determine (e.g., by running simulations) how to layout the fixed components within the space available. In certain cases, a layout may be chosen to minimize the number of fixed components needed and/or the amount of space used by those components. The fixed components 720 and mobile components 710 may be deployed in separate stages or all at once. In additional examples, certain of the mobile components 710 may only be brought in during particular time periods or to complete particular tasks.

In some examples, global control system 750 may include a central planning system that assigns tasks to different robotic devices within fleet 700. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 750 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 700. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 700. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 750 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 700 and objects undergoing processing by the robotic devices. In some examples, the map may be continuously updated with information about dynamic objects (e.g., moving robots and packages moved by robots). In additional examples, a dynamic map could contain information on both the current configuration and placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 710 within robotic fleet 700 may periodically receive charged batteries from a battery exchange station 726 equipped with multiple battery chargers. In particular, the station 726 may replace a mobile robot's old batteries with recharged batteries, which may prevent robots from having to sit and wait for batteries to charge. The battery exchange station 726 may be equipped with a robotic manipulator such as a robotic arm. The robotic manipulator may remove batteries from an individual mobile robot and attach the batteries to available battery chargers. The robotic manipulator may then move charged batteries located at the station 726 into the mobile robot to replace the removed batteries. For instance, an AGV 712 with a weak battery may be controlled to move over to battery exchange station 726 where a robotic arm pulls a battery out from the AGV 712, puts the battery in a charger, and gives the AGV 712 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 700 may contain a number of different types of mobile components 710 that use different types of batteries. A battery exchange station 726 may therefore be equipped with different types of battery chargers for different types of batteries and/or mobile robots. The battery exchange station 726 may also be equipped with a robotic manipulator that can replace batteries for different types of robots. In some examples, mobile robots may have battery containers containing multiple batteries. For instance, an autonomous fork truck 714 such as a pallet jack may have a steel bucket with 3 or 4 batteries. The robotic arm at the station 726 may be configured to lift out the entire bucket of batteries and attach individual batteries to battery chargers on a shelf at the station 726. The robotic arm may then find charged batteries to replace the old batteries, and move those batteries back into the bucket before reinserting the bucket into the pallet jack.

In further examples, global control system 750 and/or a separate control system of the battery exchange station 726 may also automate battery management strategies. For instance, each battery may have a barcode or other identifying mark so that the system can identify individual batteries. A control system of the battery exchange station 726 may count how many times individual batteries have been recharged (e.g., to determine when to change water or empty batteries completely). The control system may also keep track of which batteries have spent time in which robotic devices, how long the batteries took to recharge at the station 726 in the past, and other relevant properties for efficient battery management. This battery usage information may be used by the control system to select batteries for the robotic manipulator to give to particular mobile robots.

In additional examples, a battery exchange station 726 may also involve a human operator in some cases. For instance, the station 726 could include a rig where people can safely perform manual battery changing or deliver new batteries to the station for deployment into the fleet 700 when necessary.

FIGS. 8A-8D illustrate several examples of robotic devices that may be included within a robotic warehouse fleet. Other robotic devices which vary in form from those illustrated here as well as other types of robotic devices may also be included.

Figure 8A:
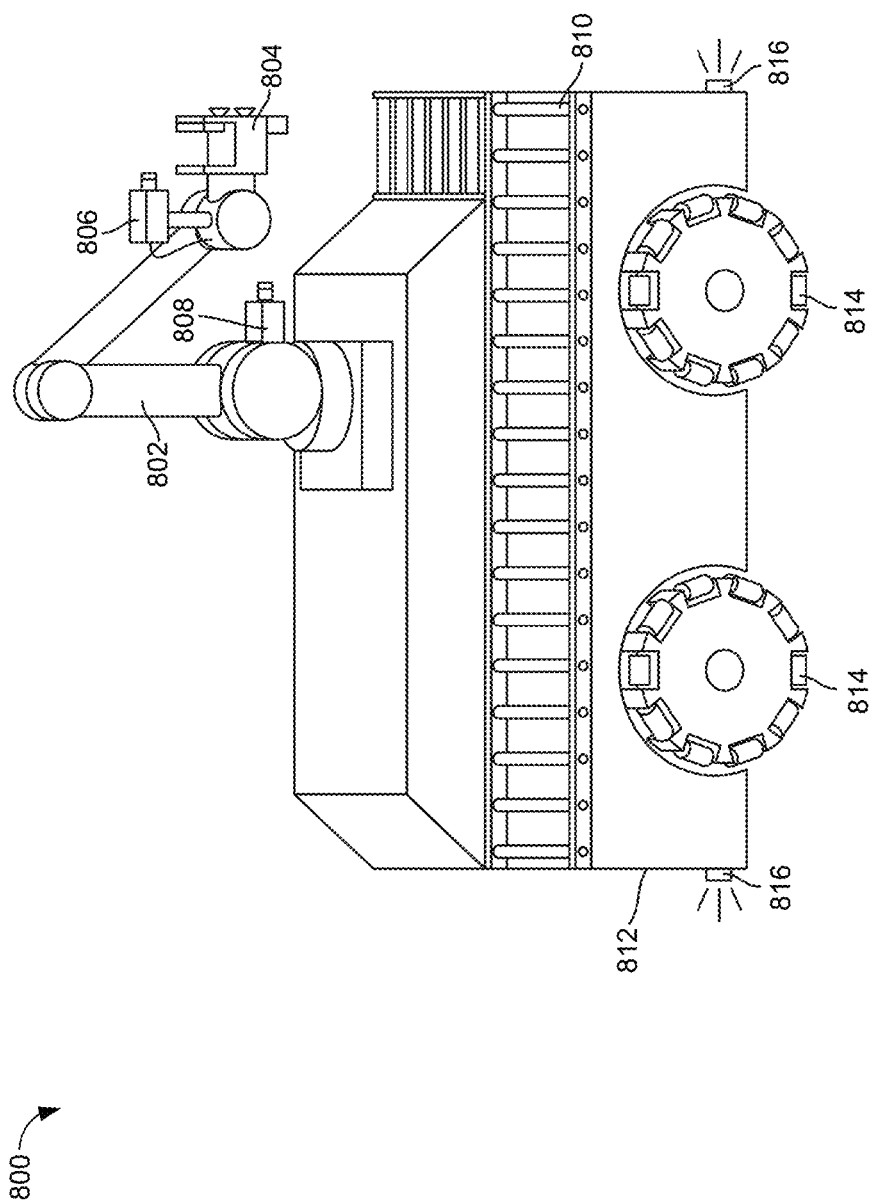
FIG. 8A shows a robotic truck unloader, according to an example embodiment.

FIG. 8A illustrates a robotic truck unloader, according to an example embodiment. In some examples, a robotic truck unloader may include one or more sensors, one or more computers, and one or more robotic arms. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

The robotic truck unloader 800 may include a robotic arm 802 with a gripping component 804 for gripping objects within the environment. The robotic arm 802 may use the gripping component 804 to pick up and place boxes to load or unload trucks or other containers. The truck unloader 800 may also include a moveable cart 812 with wheels 814 for locomotion. The wheels 814 may be holonomic wheels that allow the cart 812 to move with two degrees of freedom. Additionally, a wraparound front conveyor belt 810 may be included on the holonomic cart 812. In some examples, the wrap around front conveyer belt may allow the truck loader 800 to unload or load boxes from or to a truck container or pallet without having to rotate gripper 804.

In further examples, a sensing system of robotic truck unloader 800 may use one or more sensors attached to a robotic arm 802, such as sensor 806 and sensor 808, which may be two-dimensional (2D) sensors and/or 3D depth sensors that sense information about the environment as the robotic arm 802 moves. The sensing system may determine information about the environment that can be used by a control system (e.g., a computing device running motion planning software) to pick and move boxes efficiently. The control system could be located on the device or could be in remote communication with the device. In further examples, scans from one or more 2D or 3D sensors with fixed mounts on a mobile base, such as a front navigation sensor 816 and a rear navigation sensor 818, and one or more sensors mounted on a robotic arm, such as sensor 806 and sensor 808, may be integrated to build up a digital model of the environment, including the sides, floor, ceiling, and/or front wall of a truck or other container. Using this information, the control system may cause the mobile base to navigate into a position for unloading or loading.

In further examples, the robotic arm 802 may be equipped with a gripper 804, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

The truck unloader 800 may additionally include a motor, which may be an electric motor powered by electrical power, or may be powered by a number of different energy sources, such as a gas-based fuel or solar power. Additionally, the motor may be configured to receive power from a power supply. The power supply may provide power to various components of the robotic system and could represent, for example, a rechargeable lithium-ion or lead-acid battery. In an example embodiment, one or more banks of such batteries could be configured to provide electrical power. Other power supply materials and types are also possible.

Figure 8B:
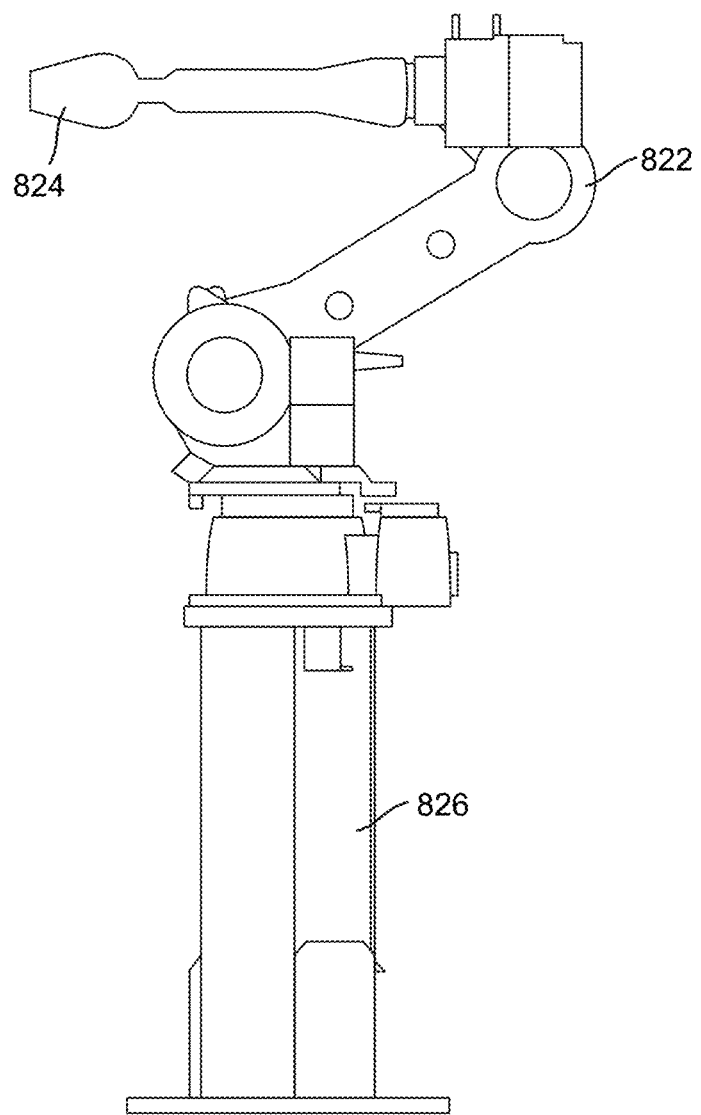
FIG. 8B shows a robotic arm on a pedestal, according to an example embodiment.

FIG. 8B illustrates a robotic arm on a pedestal, according to an example embodiment. More specifically, pedestal robot 820 may be positioned within an environment such as a warehouse environment and used to pick up, move, and/or otherwise manipulate objects within reach. In some examples, the pedestal robot 820 may be specialized for heavy lifting without requiring batteries to operate. The pedestal robot 820 may include a robotic arm 822 with an end-effector-mounted gripper 824, which may be of the same type as the robotic manipulator 802 and gripper 804 described with respect to the robotic truck unloader 800. The robotic arm 822 may be mounted on a pedestal 826, which may allow the robotic arm 822 to easily pick up and move nearby packages, such as to distribute packages between different mobile robots. In some examples, the robotic arm 822 may also be operable to construct and/or deconstruct pallets of boxes. In additional examples, the pedestal 826 may include an actuator to allow a control system to change the height of the robotic arm 822.

In further examples, a bottom surface of the pedestal robot 820 may be a pallet-shaped structure. For instance, the bottom surface may have dimension and shape roughly equivalent to other pallets used for object transport or storage within a warehouse. By shaping the bottom of the pedestal robot 820 as a pallet, the pedestal robot 820 may be picked up and moved to different locations within a warehouse environment by a pallet jack or different type of autonomous fork truck. For instance, when a delivery truck arrives at a particular docking port of the warehouse, a pedestal robot 820 may be picked up and moved to a location closer to the delivery truck to more efficiently process boxes coming from or going to the delivery truck.

In additional examples, the pedestal robot 820 may also include one or more visual sensors to identify boxes and/or other robotic devices within the vicinity of the pedestal robot 820. For instance, a control system of the pedestal robot 820 or a global control system may use sensor data from sensors on the pedestal robot 820 to identify boxes for the robotic arm 822 and gripper 824 of the pedestal robot 820 to pick up or manipulate. In further examples, the sensor data may also be used to identify mobile robotic devices in order to determine where to distribute individual boxes. Other types of robotic fixed manipulation stations may also be used within a heterogeneous robotic fleet as well.

Figure 8C:
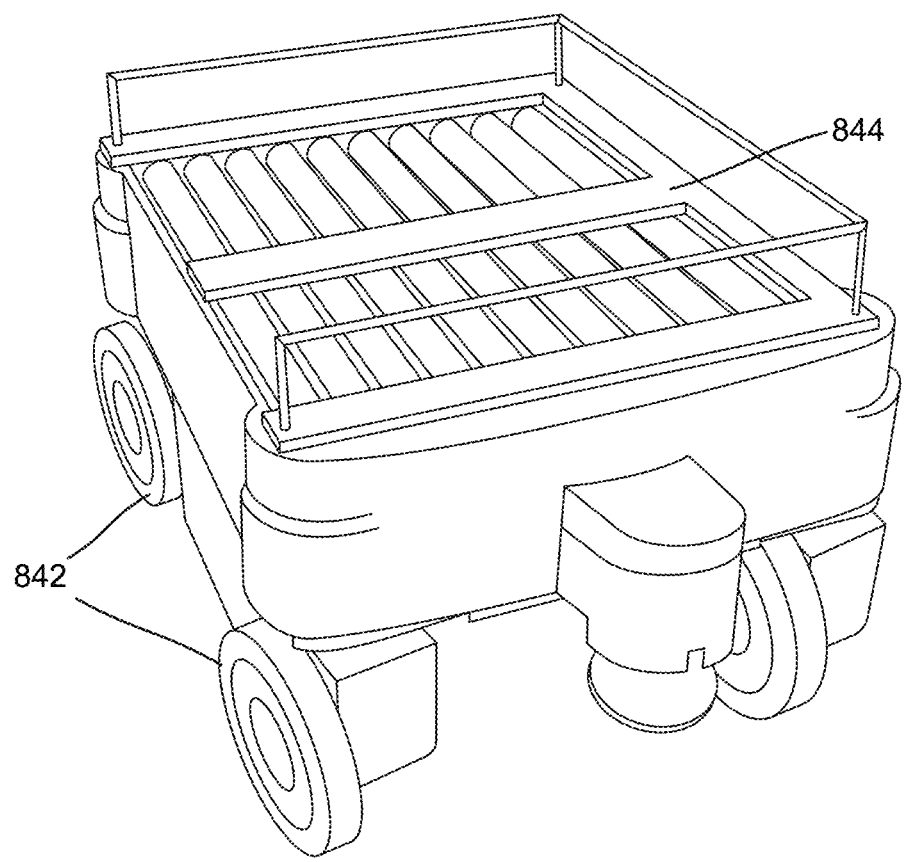
FIG. 8C shows an autonomous guided vehicle, according to an example embodiment.

FIG. 8C shows an autonomous guided vehicle (AGV), according to an example embodiment. More specifically, AGV 840 may be a relatively small, mobile robotic device that is capable of transporting individual boxes or cases. The AGV 840 may include wheels 842 to allow for locomotion within a warehouse environment. Additionally, a top surface 844 of the AGV 840 may be used to places boxes or other objects for transport. In some examples, the top surface 844 may include rotating conveyors to move objects to or from the AGV 840. In additional examples, the AGV 840 may be powered by one or more batteries that can be quickly recharged at a battery charging station and/or exchanged for fresh batteries at a battery exchange station. In further examples, the AGV 840 may additionally include other components not specifically identified here, such as sensors for navigation. AGVs with different shapes and sizes also may be included within a robotic warehouse fleet, possibly depending on the types of packages handled by a warehouse.

Figure 8D:
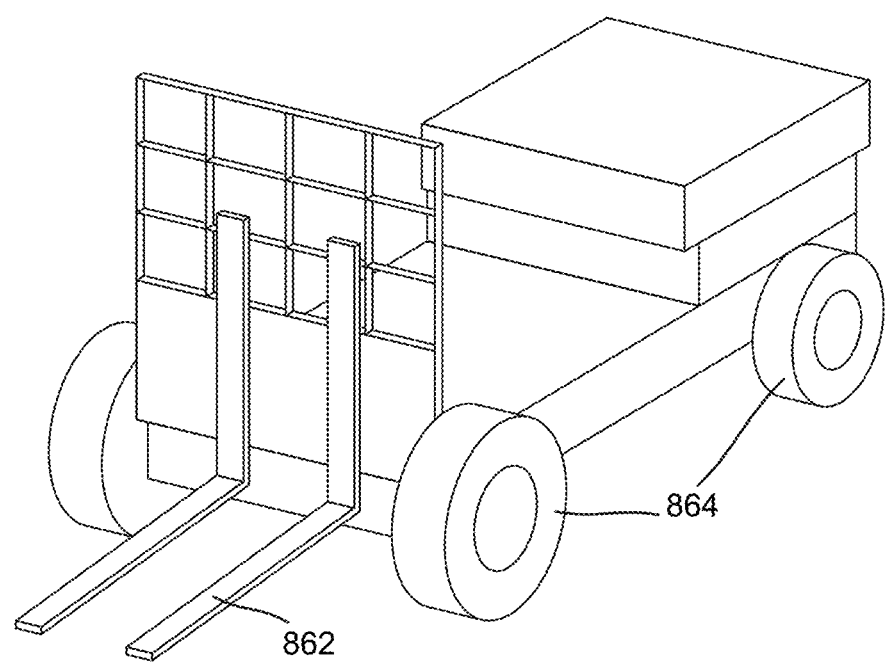
FIG. 8D shows an autonomous fork truck, according to an example embodiment.

FIG. 8D shows an autonomous fork truck, according to an example embodiment. More specifically, autonomous fork truck 860 may include a forklift 862 for lifting and/or moving pallets of boxes or other larger materials. In some examples, the forklift 862 may be elevated to reach different racks of a storage rack or other fixed storage structure within a warehouse. The autonomous fork truck 860 may additionally include wheels 864 for locomotion to transport pallets within the warehouse. In additional examples, the autonomous fork truck may include a motor and power supply as well as a sensing system, such as those described with respect to robotic truck unloader 800. The autonomous fork truck 860 may also vary in size or shape from the one illustrated in FIG. 8D.

Computing Device Architecture

Figure 9A:
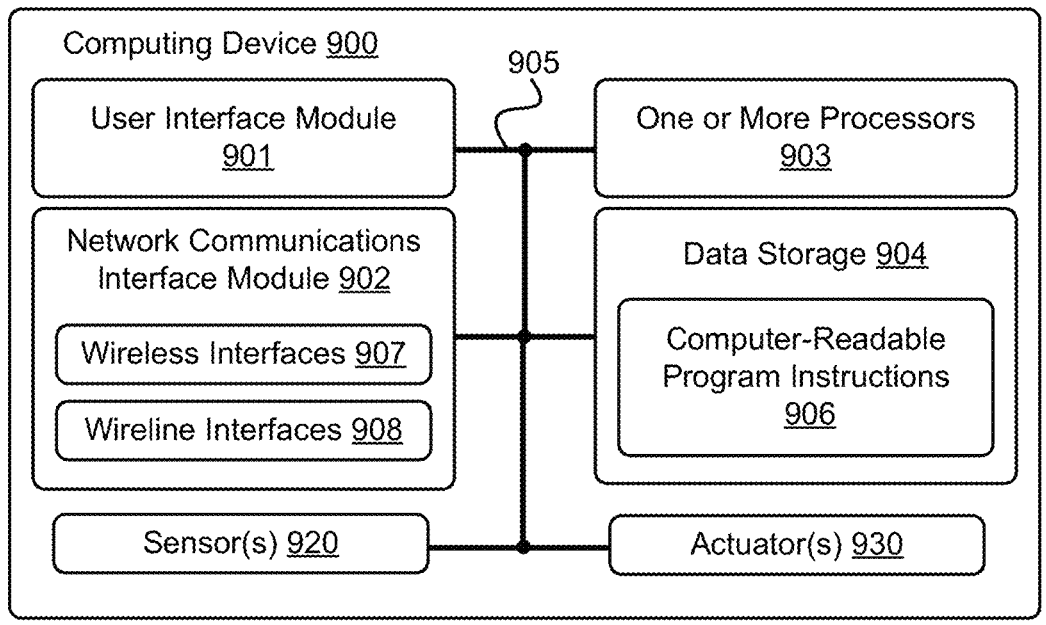
FIG. 9A is a functional block diagram of an example computing device, in accordance with an example embodiment.

FIG. 9A is a block diagram of a computing device 900 (e.g., system) in accordance with an example embodiment. In particular, computing device 900 shown in FIG. 9A can be configured to perform one or more functions of the computing device of scenario 100, the computing device of scenario 200, network 914, method 1000, and one or more functions related to one or more of scenarios 100 and 200. Computing device 900 may include a user interface module 901, a network-communication interface module 902, one or more processors 903, data storage 904, one or more sensors 920, and one or more actuators 930, all of which may be linked together via a system bus, network, or other connection mechanism 905.

User interface module 901 can be operable to send data to and/or receive data from external user input/output devices. For example, user interface module 901 can be configured to send and/or receive data to and/or from user input devices such as a keyboard, a keypad, a touch screen, a computer mouse, a track ball, a joystick, a camera, a voice recognition module, and/or other similar devices. User interface module 901 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 901 can also be configured to generate audible output(s), such as a speaker, speaker jack, audio output port, audio output device, earphones, and/or other similar devices.

Network-communications interface module 902 can include one or more wireless interfaces 907 and/or one or more wireline interfaces 908 that are configurable to communicate via a network. Wireless interfaces 907 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 908 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 902 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 903 can include one or more general purpose processors and/or one or more special purpose processors (e.g., digital signal processors, graphics processing units, application specific integrated circuits, etc.). Processors 903 can be configured to execute computer-readable program instructions 906 that are contained in the data storage 904 and/or other instructions as described herein.

Data storage 904 can include one or more computer-readable storage media that can be read and/or accessed by at least one of processors 903. The one or more computer-readable storage media can include volatile and/or non-volatile storage components, such as optical, magnetic, organic or other memory or disc storage, which can be integrated in whole or in part with at least one of processors 903. In some embodiments, data storage 904 can be implemented using a single physical device (e.g., one optical, magnetic, organic or other memory or disc storage unit), while in other embodiments, data storage 904 can be implemented using two or more physical devices.

Data storage 904 can include computer-readable program instructions 906 and perhaps additional data. In some embodiments, data storage 904 can additionally include storage required to perform at least part of the methods and techniques and/or at least part of the functionality of the devices and networks; e.g., one or more images, such as one or more target images and/or one or more binary images, source file(s), source map(s), target file(s), target map(s), transfer(s), transfer list(s), auxiliary data, graph(s), and/or update package(s).

In some embodiments, computing device 900 can include one or more sensors 920. Sensor(s) 920 can be configured to measure conditions in an environment for computing device 900 and provide data about that environment. In some examples, sensor(s) 920 can include one or more of: a gyroscope, an accelerometer, a Doppler sensor, a sonar sensor, a radar device, a laser-displacement sensor, and a compass, possibly to measure locations and/or movements of the computing device 900. In other examples, sensor(s) 920 can include one or more of: an infrared sensor, an optical sensor, a light sensor, a camera, a biosensor, a capacitive sensor, a touch sensor, a temperature sensor, a wireless sensor, a radio sensor, a sound sensor, and/or a smoke sensor, possibly to obtain data indicative of an environment of the computing device 900. In addition, sensor(s) 920 can include one or more sensors that measure forces acting about the computing device 900. For example, sensor(s) 920 can include one or more sensors that measure forces (e.g., inertial forces and/or G-forces) in multiple dimensions. Further, sensor(s) 920 can include one or more sensors that measure: torque, ground force, friction, and/or a zero moment point (ZMP) sensor that identifies ZMPs and/or locations of the ZMPs. Other examples of sensor(s) 920 are possible as well.

Computing device 900 can include one or more actuators 930 that enable computing device 900 to initiate movement. For example, actuator(s) 930 can include or be incorporated with robotic joints connecting robotic limbs to a robotic body. For example, actuator(s) 930 can include respective robotic hip and robotic shoulder joints connecting respective robotic legs and arms to the robotic body. Further, the actuator(s) 930 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 930 can include respective robotic ankle joints connecting the robotic legs to robotic feet and respective robotic wrist joints connecting the robotic arms to robotic hands. In addition, actuator(s) 930 can include motors for moving the robotic limbs. As such, the actuator(s) 930 can enable mobility of computing device 900. Other examples of actuator(s) 930 are possible as well.

Cloud-Based Servers

Figure 9B:
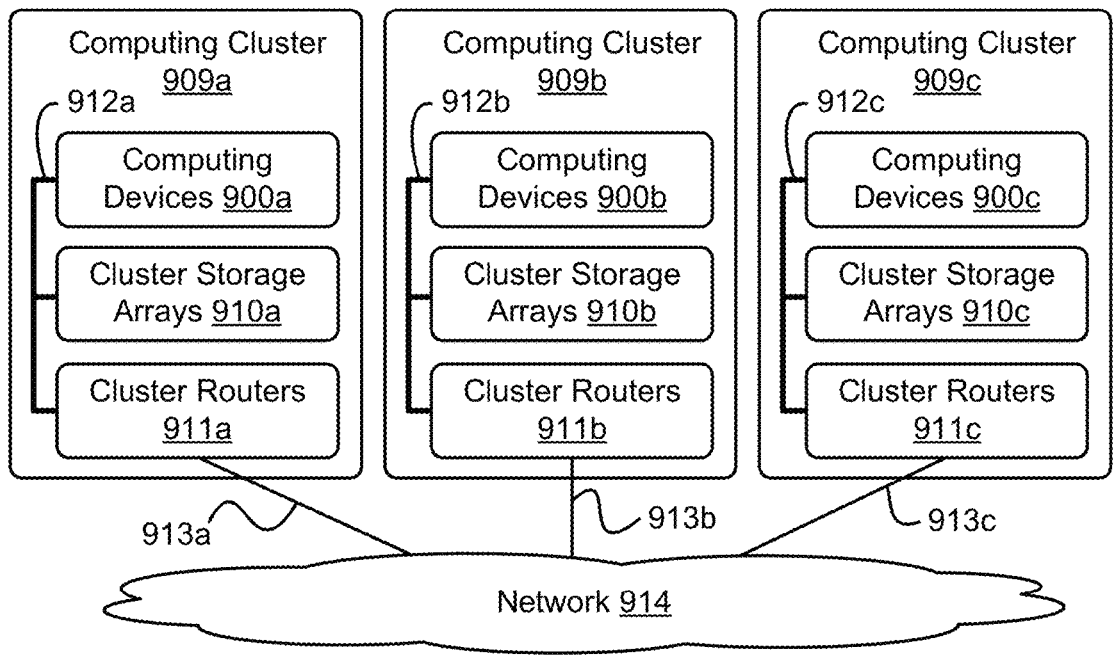
FIG. 9B depicts a cloud-based server system, in accordance with an example embodiment.

FIG. 9B depicts a network 914 of computing clusters 909a, 909b, 909c arranged as a cloud-based server system in accordance with an example embodiment. Computing clusters 909a, 909b, 909c can be cloud-based devices that store program logic and/or data of cloud-based applications and/or services; e.g., some or all of the herein-described functionality related to scenario 100, scenario 200, and/or method 1000.

In some embodiments, computing clusters 909a, 909b, 909c can be a single computing device residing in a single computing center. In other embodiments, computing clusters 909a, 909b, 909c can include multiple computing devices in a single computing center, or even multiple computing devices located in multiple computing centers located in diverse geographic locations. For example, FIG. 9B depicts each of computing clusters 909a, 909b, 909c residing in different physical locations.

In some embodiments, data and services at computing clusters 909a, 909b, 909c can be encoded as computer readable information stored in non-transitory, tangible computer readable media (or computer readable storage media) and accessible by other computing devices. In some embodiments, computing clusters 909a, 909b, 909c can be stored on a single disk drive or other tangible storage media, or can be implemented on multiple disk drives or other tangible storage media located at one or more diverse geographic locations.

FIG. 9B depicts a cloud-based server system in accordance with an example embodiment. In FIG. 9B, functionality of the computing device of scenario 200 can be distributed among three computing clusters 909a, 909b, and 909c. Computing cluster 909a can include one or more computing devices 900a, cluster storage arrays 910a, and cluster routers 911 a connected by a local cluster network 912a. Similarly, computing cluster 909b can include one or more computing devices 900b, cluster storage arrays 910b, and cluster routers 911b connected by a local cluster network 912b. Likewise, computing cluster 909c can include one or more computing devices 900c, cluster storage arrays 910c, and cluster routers 911c connected by a local cluster network 912c.

In some embodiments, each of the computing clusters 909a, 909b, and 909c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 909a, for example, computing devices 900a can be configured to perform various computing tasks of the computing device of scenario 200. In one embodiment, the various functionalities of the computing device of scenario 200 can be distributed among one or more computing devices 900a, 900b, and 900c. Computing devices 900b and 900c in respective computing clusters 909b and 909c can be configured similarly to computing devices 900a in computing cluster 909a. On the other hand, in some embodiments, computing devices 900a, 900b, and 900c can be configured to perform different functions.

In some embodiments, computing tasks and stored data associated with the computing device of scenario 200 can be distributed across computing devices 900a, 900b, and 900c based at least in part on the processing requirements of the computing device of scenario 200, the processing capabilities of computing devices 900a, 900b, and 900c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 910a, 910b, and 910c of the computing clusters 909a, 909b, and 909c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of the computing device of scenario 200 can be distributed across computing devices 900a, 900b, and 900c of computing clusters 909a, 909b, and 909c, various active portions and/or backup portions of these components can be distributed across cluster storage arrays 910a, 910b, and 910c. For example, some cluster storage arrays can be configured to store one portion of the data of the computing device of scenario 200, while other cluster storage arrays can store other portion(s) of data of the computing device of scenario 200. Additionally, some cluster storage arrays can be configured to store backup versions of data stored in other cluster storage arrays.

The cluster routers 911a, 911b, and 911c in computing clusters 909a, 909b, and 909c can include networking equipment configured to provide internal and external communications for the computing clusters. For example, the cluster routers 911 a in computing cluster 909a can include one or more internet switching and routing devices configured to provide (i) local area network communications between the computing devices 900a and the cluster storage arrays 910a via the local cluster network 912a, and (ii) wide area network communications between the computing cluster 909a and the computing clusters 909b and 909c via the wide area network connection 913 a to network 914. Cluster routers 911b and 911c can include network equipment similar to the cluster routers 911a, and cluster routers 911b and 911c can perform similar networking functions for computing clusters 909b and 909b that cluster routers 911 a perform for computing cluster 909a.

In some embodiments, the configuration of the cluster routers 911a, 911b, and 911c can be based at least in part on the data communication requirements of the computing devices and cluster storage arrays, the data communications capabilities of the network equipment in the cluster routers 911a, 911b, and 911c, the latency and throughput of local networks 912a, 912b, 912c, the latency, throughput, and cost of wide area network links 913a, 913b, and 913c, and/or other factors that can contribute to the cost, speed, fault-tolerance, resiliency, efficiency and/or other design goals of the moderation system architecture.

Example Methods of Operation

Figure 10:
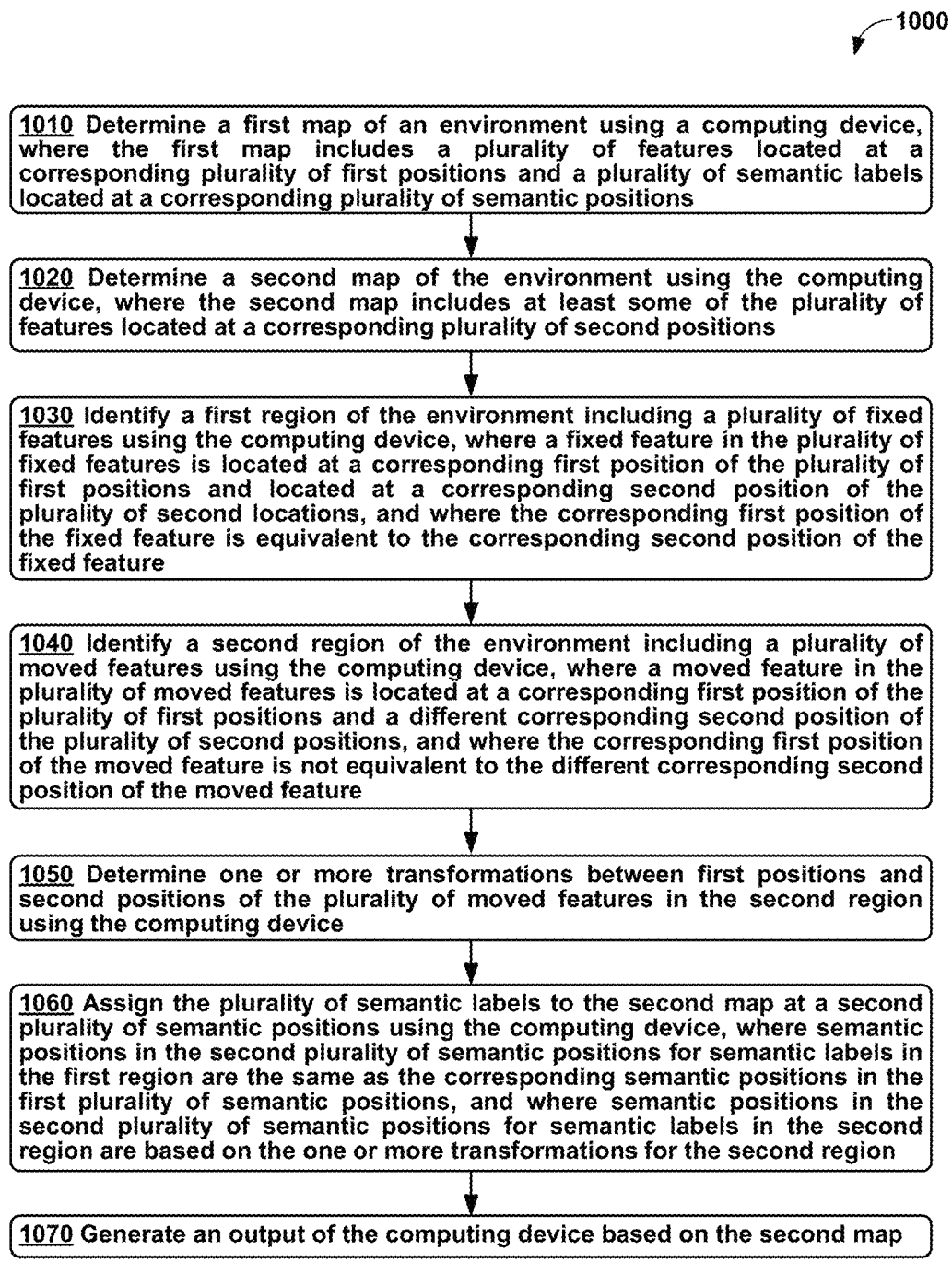
FIG. 10 is a flowchart of a method, in accordance with an example embodiment.

FIG. 10 is a flowchart of a method 1000, in accordance with an example embodiment. Method 1000 can be executed on a computing device. Example computing devices include, but are not limited to, computing device 900, a computing device aboard the robotic device of scenario 100, the computing device of scenario 200, one or more computing devices aboard a robotic device, and/or other computing device(s).

Method 1000 can begin at block 1010, where the computing device can determine a first map of an environment. The first map can include a plurality of features located at a corresponding plurality of first positions and can include a plurality of semantic labels located at a corresponding plurality of semantic positions, such as discussed above in the context of FIGS. 1-6; e.g., at least map 110a of FIG. 1, map 210a of FIG. 2, and map 310a of FIG. 3. In some embodiments, the environment includes an indoor environment, such as discussed above in the context of scenarios 100 and 200.

At block 1020, the computing device can determine a second map of the environment. The second map can include at least some of the plurality of features located at a corresponding plurality of second positions, such as discussed above in the context of FIGS. 1-6; e.g., at least map 110b of FIG. 1, map 210b of FIG. 2, and map 310b of FIG. 3. In some embodiments, the computing device can determine the first map and/or the second map by generating the map(s) using a mapping algorithm, such as a SLAM algorithm. In particular of these embodiments, the computing device can be configured with actuators and/or sensors configured to enable the computing device to move through and observe the environment in order to generate the map, such as discussed above in the context of at least FIGS. 1 and 9A.

In other of these embodiments, determining the second map includes: determining a current position of a particular feature of the plurality of features; determining whether the current position of the particular feature is equivalent to a first position for the particular feature; and after determining that the current position of the particular feature is not equivalent to a first position for the particular feature, determining the second map of the environment, such as discussed above in the context of at least FIG. 1.

In still other of these embodiments, a particular semantic label of the plurality of semantic labels can be associated with a particular object and the particular semantic label can correspond to a particular semantic position of the plurality of semantic positions. Then, determining the second map can include: determining a current position of the particular object; determining whether the current position of the particular object is equivalent to the particular semantic position; and after determining that the current position of the particular object is not equivalent to the particular semantic position, determining the second map of the environment, such as discussed above in the context of at least FIG. 1. In even other of these embodiments, determining the second map can include determining the second map at periodic intervals in time, such as discussed above in the context of at least FIG. 1.

At block 1030, the computing device can identify a first region of the environment that includes a plurality of fixed features. A fixed feature in the plurality of fixed features can be located at a corresponding first position of the plurality of first positions and can be located at a corresponding second position of the plurality of second locations, where the corresponding first position of the fixed feature is equivalent to the corresponding second position of the fixed feature, such as discussed above in the context of FIGS. 1-6; e.g., at least regions 140*a*, 140*b* of FIG. 1 with their associated features, buildings 212*a*, 220*a* and tents 228*a*, 232*a* of FIGS. 2 and 3 with their associated features, buildings 412, 420 and tents 428, 432 of FIG. 4 with their associated features.

At block 1040, the computing device can identify a second region of the environment. The second region can include a plurality of moved features, A moved feature in the plurality of moved features is located at a corresponding first position of the plurality of first positions and at a different corresponding second position of the plurality of second positions, where the corresponding first position of the moved feature is not equivalent to the different corresponding second position of the moved feature, such as discussed above in the context of FIGS. 1-6; e.g., at least regions 142*a*, 142*b* of FIG. 1 with their associated features, tents 238*a*, 238*b*, 244*a*, 248*b*, 250*a*, 250*b* of FIGS. 2 and 3 with their associated features, and regions 438, 444, 450 of FIG. 4 with their associated features.

At block 1050, the computing device can determine one or more transformations between first positions and second positions of the plurality of moved features in the second region, such as discussed above in the context of FIGS. 1-6; e.g., at least feature correspondences 122*c*, 126*c* and location transformation 134*c* of FIG. 1, transformations 500, 540, and regional estimations 570, 580, 590 of FIGS. 5A-5B.

In some embodiments, the one or more transformations of positions can include an affine transformation of an initial position to a transformed position, such as discussed above in the context of at least FIGS. 5A-6, and particularly in the context of at least transformations 500 and 540 of FIGS. 5A and 5B. In particular embodiments, the affine transformation can include at least one of: a rotation related to the initial position, a translation related to the initial position, a reflection related to the initial position, and a combination of one or more rotations, translations, and reflections, such as discussed above in the context of at least FIGS. 5A-6, and particularly in the context of at least transformations 500 and 540 of FIGS. 5A and 5B.

At block 1060, the computing device can assign the plurality of semantic labels to the second map at a second plurality of semantic positions. The semantic positions in the second plurality of semantic positions for semantic labels in the first region can be the same as the corresponding semantic positions in the first plurality of semantic positions, and the semantic positions in the second plurality of semantic positions for semantic labels in the second region can be based on the one or more transformations, such as discussed above in the context of at least FIGS. 1 and 6; e.g., at least the "Coffee Maker" semantic label of FIG. 1, the "Lead Wolves", "Lead Hawks", "Water Sports", "Land Sports", "Arts", and "Camp Gear" semantic labels discussed in general in the context of FIGS. 2-4, 5C, and 6, and in particular in the context of FIG. 6.

In some embodiments, the environment can include at least a third region that differs from the first region and the second region, where the third region includes one or more third features. Then, method 1000 can include: determining one or more moved third features of the one or more third features, where each moved third feature of the one or more moved third features is located at a corresponding first position of the plurality of first positions and a different corresponding second position of the plurality of second positions; and determining a second transformation for the third region between first positions and second positions for the second plurality of moved features, where semantic positions in the second plurality of semantic positions for semantic labels in the third region are based on the second transformation for the third region, such as discussed above in the context of at least FIGS. 5C and 6; e.g., at least feature estimations 570, 580, and 590.

At block 1070, the computing device can generate an output based on the second map. In some embodiments, the computing device can be part of a robotic device. In these embodiments, determining the first map can include determining a first map based on first data obtained by one or more sensor devices of the robotic device, determining the second map can include determining the second map based on second data obtained by the one or more sensor devices of the robotic device, and where generating the output can include navigating the robotic device through the environment based on guidance provided by at least one semantic label of the second map, such as discussed above in the context of at least the computing device and robotic device(s) of scenario 100 of FIG. 1 and scenario 200 of FIGS. 2-6.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
   determining a first map of an environment using a computing device, wherein the first map comprises a plurality of features located at a corresponding plurality of first positions and a plurality of semantic labels located at a corresponding plurality of semantic positions;
   determining a second map of the environment using the computing device, wherein the second map comprises at least some of the plurality of features located at a corresponding plurality of second positions;
   identifying a plurality of moved features using the computing device, wherein a moved feature in the plurality of moved features is located at a corresponding first position of the plurality of first positions and a different corresponding second position of the plurality of second positions, and wherein the corresponding first position of the moved feature is not equivalent to the different corresponding second position of the moved feature;
   for each semantic label of the plurality of semantic labels, the computing device identifying a nearby subset of the plurality of moved features;
   for each semantic label of the plurality of semantic labels, the computing device determining a transformation based on a coordinate mapping between the first positions and the second positions of the nearby subset of moved features identified for the semantic label;
   for each semantic label of the plurality of semantic labels, the computing device assigning a semantic position in the second map to the semantic label using the transformation determined for the semantic label; and
   generating an output of the computing device based on the second map.

2. The method of claim 1, wherein the computing device is part of a robotic device, wherein determining the first map comprises determining a first map based on first data obtained by one or more sensor devices of the robotic device, wherein determining the second map comprises determining the second map based on second data obtained by the one or more sensor devices of the robotic device, and wherein generating the output comprises navigating the robotic device through the environment based on guidance provided by at least one semantic label of the second map.

3. The method of claim 1, wherein determining the transformation based on the coordinate mapping comprises determining an affine transformation of an initial position to a transformed position.

4. The method of claim 3, wherein the affine transformation comprises at least one of: a rotation related to the initial position, a translation related to the initial position, a reflection related to the initial position, and a combination of one or more rotations, translations, and reflections.

5. The method of claim 1, wherein determining the second map comprises:
   determining a current position of a particular feature of the plurality of features;
   determining whether the current position of the particular feature is equivalent to a first position for the particular feature; and
   after determining that the current position of the particular feature is not equivalent to a first position for the particular feature, determining the second map of the environment.

6. The method of claim 1, wherein a particular semantic label of the plurality of semantic labels is associated with a particular object and the particular semantic label corresponds to a particular semantic position of the plurality of semantic positions, and wherein determining the second map comprises:

determining a current position of the particular object;

determining whether the current position of the particular object is equivalent to the particular semantic position; and after determining that the current position of the particular object is not equivalent to the particular semantic position, determining the second map of the environment.

7. The method of claim 1, wherein determining the second map comprises determining the second map at periodic intervals in time.

8. The method of claim 1, wherein the environment comprises at least a third region that differs from the first region, wherein the third region comprises one or more third features, and wherein the method further comprises:

determining one or more moved third features of the one or more third features, wherein each moved third feature of the one or more moved third features is located at a corresponding first position of the plurality of first positions and a different corresponding second position of the plurality of second positions, and where the corresponding first position of the moved feature is not equivalent to the different corresponding second position of the moved feature; and determining one or more second transformations for the third region between first positions and second positions of the one or more moved third features, wherein semantic positions in the second plurality of semantic positions for semantic labels in the third region are based on the one or more second transformations for the third region.

9. A computing device, comprising:

one or more processors; and data storage including at least computer-executable instructions stored thereon that, when executed by the one or more processors, cause the computing device to perform functions comprising:

determining a first map of an environment, wherein the first map comprises a plurality of features located at a corresponding plurality of first positions and a plurality of semantic labels located at a corresponding plurality of semantic positions;

determining a second map of the environment, wherein the second map comprises at least some of the plurality of features located at a corresponding plurality of second positions;

identifying a plurality of moved features, wherein a moved feature in the plurality of moved features is located at a corresponding first position of the plurality of first positions and a different corresponding second position of the plurality of second positions, and wherein the corresponding first position of the moved feature is not equivalent to the different corresponding second position of the moved feature;

for each semantic label of the plurality of semantic labels, identifying a nearby subset of the plurality of moved features;

for each semantic label of the plurality of semantic labels, determining a transformation based on a coordinate mapping between the first positions and the second positions of the nearby subset of moved features identified for the semantic label;

for each semantic label of the plurality of semantic labels, assigning a semantic position in the second map to the semantic label using the transformation determined for the semantic label; and generating an output based on the second map.

10. The computing device of claim 9, wherein the computing device is part of a robotic device, wherein determining the first map comprises determining a first map based on first data obtained by one or more sensor devices of the robotic device, wherein determining the second map comprises determining the second map based on second data obtained by the one or more sensor devices of the robotic device, and wherein generating the output comprises navigating the robotic device through the environment based on guidance provided by at least one semantic label of the second map.

11. The computing device of claim 9, wherein determining the transformation based on the coordinate mapping comprises determining an affine transformation of an initial position to a transformed position.

12. The computing device of claim 11, wherein the affine transformation comprises at least one of: a rotation related to the initial position, a translation related to the initial position, a reflection related to the initial position, and a combination of one or more rotations, translations, and reflections.

13. The computing device of claim 9, wherein determining the second map comprises:

determining a current position of a particular feature of the plurality of features;

determining whether the current position of the particular feature is equivalent to a first position for the particular feature; and after determining that the current position of the particular feature is not equivalent to a first position for the particular feature, determining the second map of the environment.

14. The computing device of claim 9, wherein a particular semantic label of the plurality of semantic labels is associated with a particular object and the particular semantic label corresponds to a particular semantic position of the plurality of semantic positions, and wherein determining the second map comprises:

determining a current position of the particular object;

determining whether the current position of the particular object is equivalent to the particular semantic position; and after determining that the current position of the particular object is not equivalent to the particular semantic position, determining the second map of the environment.

15. The computing device of claim 9, wherein determining the second map comprises determining the second map at periodic intervals in time.

16. The computing device of claim 9, wherein the environment comprises at least a third region that differs from the first region, wherein the third region comprises one or more third features, and wherein the functions further comprise:

determining one or more moved third features of the one or more third features, wherein each moved third feature of the one or more moved third features is located at a corresponding first position of the plurality of first positions and a different corresponding second position of the plurality of second positions; and determining one or more second transformations for the third region between first positions and second positions of the one or more moved third features, wherein semantic positions in the second plurality of semantic positions for semantic labels in the third region are based on the one or more second transformations for the third region.

17. A non-transitory computer readable medium having stored thereon instructions, that when executed by one or more processors of a computing device, cause the computing device to perform functions comprising:

determining a first map of an environment, wherein the first map comprises a plurality of features located at a corresponding plurality of first positions and a plurality of semantic labels located at a corresponding plurality of semantic positions;

determining a second map of the environment, wherein the second map comprises at least some of the plurality of features located at a corresponding plurality of second positions;

identifying a plurality of moved features, wherein a moved feature in the plurality of moved features is located at a corresponding first position of the plurality of first positions and a different corresponding second position of the plurality of second positions, and wherein the corresponding first position of the moved feature is not equivalent to the different corresponding second position of the moved feature;

for each semantic label of the plurality of semantic labels, identifying a nearby subset of the plurality of moved features;

for each semantic label of the plurality of semantic labels, determining a transformation based on a coordinate mapping between the first positions and the second positions of the nearby subset of moved features identified for the semantic label;

for each semantic label of the plurality of semantic labels, assigning a semantic position in the second map to the semantic label using the transformation determined for the semantic label; and generating an output based on the second map.

18. The non-transitory computer readable medium of claim 17, wherein the non-transitory computer readable medium is part of a robotic device, wherein determining the first map comprises determining a first map based on first data obtained by one or more sensor devices of the robotic device, wherein determining the second map comprises determining the second map based on second data obtained by the one or more sensor devices of the robotic device, and wherein generating the output comprises navigating the robotic device through the environment based on guidance provided by at least one semantic label of the second map.

19. The non-transitory computer readable medium of claim 17, wherein determining the transformation based on the coordinate mapping comprises determining an affine transformation of an initial position to a transformed position, and wherein the affine transformation comprises at least one of: a rotation related to the initial position, a translation related to the initial position, a reflection related to the initial position, and a combination of one or more rotations, translations, and reflections.

20. The non-transitory computer readable medium of claim 17, wherein determining the second map comprises:

determining a current position of a particular feature of the plurality of features;

determining whether the current position of the particular feature is equivalent to a first position for the particular feature; and after determining that the current position of the particular feature is not equivalent to a first position for the particular feature, determining the second map of the environment.

21. The method of claim 1, wherein identifying the plurality of moved features comprises:

determining whether a feature is in the plurality of moved features based on comparing movement of the feature to a corresponding threshold for at least one map dimension of a plurality of map dimensions.

* * * * *